US010460157B2

United States Patent
Matsunaga et al.

(10) Patent No.: US 10,460,157 B2
(45) Date of Patent: Oct. 29, 2019

(54) INFORMATION PROCESSING DEVICE, INFORMATION PROCESSING SYSTEM, AND PROGRAM

(71) Applicant: Sony Corporation, Tokyo (JP)

(72) Inventors: Hideyuki Matsunaga, Kanagawa (JP); Kosei Yamashita, Kanagawa (JP)

(73) Assignee: Sony Corporation (JP)

( * ) Notice: Subject to any disclaimer, the term of this patent is extended or adjusted under 35 U.S.C. 154(b) by 648 days.

(21) Appl. No.: 14/383,714

(22) PCT Filed: Mar. 4, 2013

(86) PCT No.: PCT/JP2013/001310
§ 371 (c)(1),
(2) Date: Sep. 8, 2014

(87) PCT Pub. No.: WO2013/136712
PCT Pub. Date: Sep. 19, 2013

(65) Prior Publication Data
US 2015/0016685 A1     Jan. 15, 2015

(30) Foreign Application Priority Data
Mar. 15, 2012  (JP) ................................ 2012-058421

(51) Int. Cl.
*G06K 9/00* (2006.01)
*G09B 19/00* (2006.01)
*G06K 9/62* (2006.01)

(52) U.S. Cl.
CPC ....... *G06K 9/00342* (2013.01); *G06K 9/6217* (2013.01); *G09B 19/0038* (2013.01)

(58) Field of Classification Search
CPC .......... G06K 9/00342; G06K 19/0038; G06K 9/6217; G09B 19/0038; A61B 5/1126;
(Continued)

(56) References Cited

U.S. PATENT DOCUMENTS

2002/0077189 A1   6/2002  Tuer et al.
2002/0114493 A1   8/2002  McNitt et al.
(Continued)

FOREIGN PATENT DOCUMENTS

CN          104169922 A    11/2014
EP          2781240 A1     9/2014
(Continued)

OTHER PUBLICATIONS

Alexander Amini: "Tennis Sensor DataAnalysis: an Automated System for Macro Motion Refin ement", Sep. 28, 2011 (Sep. 28, 2011), pp. 1-23, XP055074311, Retrieved from the Internet: URL:http://tennistek.webs.comjdocuments/EUYSproject.pdf [retrieved on Aug. 6, 2013].
(Continued)

*Primary Examiner* — David Duffy
*Assistant Examiner* — Ankit B Doshi
(74) *Attorney, Agent, or Firm* — Lerner, David, Littenberg, Krumholz & Mentlik LLP

(57) ABSTRACT

There is provided an information processing device including a control unit to generate play event information based on a determination whether detected behavior of a user is a predetermined play event.

21 Claims, 16 Drawing Sheets

(58) Field of Classification Search
CPC ............ A63B 24/0003; A63B 2220/40; A63B 2220/44; A63B 2220/833; A63B 69/3632; A63B 69/3685; A63B 69/38
See application file for complete search history.

(56) References Cited

U.S. PATENT DOCUMENTS

| | | | |
|---|---|---|---|
| 2002/0115046 A1* | 8/2002 | McNitt | A63B 24/0003 434/252 |
| 2003/0073518 A1 | 4/2003 | Marty et al. | |
| 2005/0017454 A1 | 1/2005 | Endo et al. | |
| 2007/0026975 A1 | 2/2007 | Marty et al. | |
| 2008/0182685 A1 | 7/2008 | Marty et al. | |
| 2008/0200287 A1 | 8/2008 | Marty et al. | |
| 2010/0173732 A1 | 7/2010 | Vaniche et al. | |
| 2011/0143868 A1 | 6/2011 | Marty et al. | |
| 2012/0057775 A1 | 3/2012 | Suzuki et al. | |
| 2012/0274793 A1 | 11/2012 | Choi | |
| 2013/0018493 A1 | 1/2013 | Amini | |
| 2013/0018494 A1 | 1/2013 | Amini | |
| 2013/0184613 A1* | 7/2013 | Homsi et al. | |
| 2013/0194421 A1* | 8/2013 | Kita | H04N 7/18 348/143 |
| 2014/0286621 A1 | 9/2014 | Matsunaga et al. | |

FOREIGN PATENT DOCUMENTS

| | | |
|---|---|---|
| JP | 59194761 | 5/1984 |
| JP | 03295574 | 12/1991 |
| JP | 07067982 | 3/1995 |
| JP | 07289676 | 11/1995 |
| JP | 09028849 | 2/1997 |
| JP | H09154996 A | 6/1997 |
| JP | 09239089 | 9/1997 |
| JP | 10043349 | 2/1998 |
| JP | 2000236466 A | 8/2000 |
| JP | 2002024466 A | 1/2002 |
| JP | 2002312531 A | 10/2002 |
| JP | 2002373288 A | 12/2002 |
| JP | 2003078864 A | 3/2003 |
| JP | 2003088604 A | 3/2003 |
| JP | 2003111882 A | 4/2003 |
| JP | 2003111883 A | 4/2003 |
| JP | 2004065803 A | 3/2004 |
| JP | 2004097381 A | 4/2004 |
| JP | 2004118766 A | 4/2004 |
| JP | 2004216148 A | 8/2004 |
| JP | 2004236961 A | 8/2004 |
| JP | 2005070392 A | 3/2005 |
| JP | 2005110850 A | 4/2005 |
| JP | 2007028344 A | 2/2007 |
| JP | 2008026272 A | 2/2008 |
| JP | 2008236124 A | 10/2008 |
| JP | 2009045462 A | 3/2009 |
| JP | 2009050699 A | 3/2009 |
| JP | 2009050721 A | 3/2009 |
| JP | 2009078134 A | 4/2009 |
| JP | 2009106323 A | 5/2009 |
| JP | 2009125499 A | 6/2009 |
| JP | 2009159515 A | 7/2009 |
| JP | 2010509000 A | 3/2010 |
| JP | 2010068947 A | 4/2010 |
| JP | 2010097562 A | 4/2010 |
| JP | 2010137097 A | 6/2010 |
| JP | 2010264246 A | 11/2010 |
| JP | 2011000210 A | 1/2011 |
| JP | 2011505202 A | 2/2011 |
| JP | 2011512952 A | 4/2011 |
| JP | 2011516210 A | 5/2011 |
| JP | 2011525414 A | 9/2011 |
| JP | 2011-223287 A | 11/2011 |
| JP | 2011242323 A | 12/2011 |
| JP | 2012050826 A | 3/2012 |
| JP | 2012510873 A | 5/2012 |
| JP | 2012510876 A | 5/2012 |
| JP | 2012130414 A | 7/2012 |
| JP | 2012139493 A | 7/2012 |
| JP | 2012228568 A | 11/2012 |
| JP | 2013063357 A | 4/2013 |
| JP | 2013176590 A | 9/2013 |
| JP | 2014509236 A | 4/2014 |
| JP | 2014511528 A | 5/2014 |
| JP | 2014512205 A | 5/2014 |
| JP | 2015501700 A | 1/2015 |
| JP | 2015503938 A | 2/2015 |
| JP | 2015504259 A | 2/2015 |
| JP | 2015511133 A | 4/2015 |
| JP | 2015186593 A | 10/2015 |
| KR | 20140117545 A | 10/2014 |
| WO | 03022369 A2 | 3/2003 |
| WO | 2004012150 A1 | 2/2004 |
| WO | 2007108458 A1 | 9/2007 |
| WO | 2011071277 A2 | 6/2011 |
| WO | 2013069447 A1 | 5/2013 |
| WO | 2013109777 A1 | 7/2013 |
| WO | 2015083429 A1 | 6/2015 |
| WO | 2015141251 A1 | 9/2015 |

OTHER PUBLICATIONS

Damien Connaghan et al: "Game, shot and match: Event-based indexing of tennis", Content-Based Multimedia Indexing (CBMI), 2011 9th International Workshop on, IEEE, Jun. 13, 2011 (Jun. 13, 2011), pp. 97-102, XP032004768, DOI: 10.1109/CBMI.2011. 5972528 ISBN: 978-1-61284-432-9.

Connaghan D et al: "Multi-sensor classification of tennis strokes", 2011 IEEE Sensors Proceedings : Limerick, Ireland, Oct. 28-31, 2011, IEEE, Piscataway, NJ, Oct. 28, 2011 (Oct. 28, 2011), pp. 1437-1440, XP032277439, DOI: 10.1109/ICSENS.2011.6127084 ISBN: 978-1-4244-9290-9.

International Search Report fron International Publication No. PCT/JP2013/001310 dated Aug. 16, 2013.

Japanese Office Action for JP Application No. 2012058421, dated Dec. 15, 2015.

Chinese Office Action for Chinese Application No. 201380012898. 8, dated Mar. 1, 2016.

D. Connaghan, P. Kelly, N. E. O'Connor, M. Gaffney, M. Walsh and C. O'Mathuna, "Multi-sensor classification of tennis strokes," Sensors, 2011 IEEE, Limerick, 2011, pp. 1437-1440.

Japanese Office Action for Application No. JP2016162657 dated Aug. 29, 2017.

European Examintation Report for Application No. 13716445.5 dated Sep. 12, 2016.

European Examination for Application No. EP13716445.5 dated Dec. 21, 2017.

* cited by examiner

[Fig. 1]
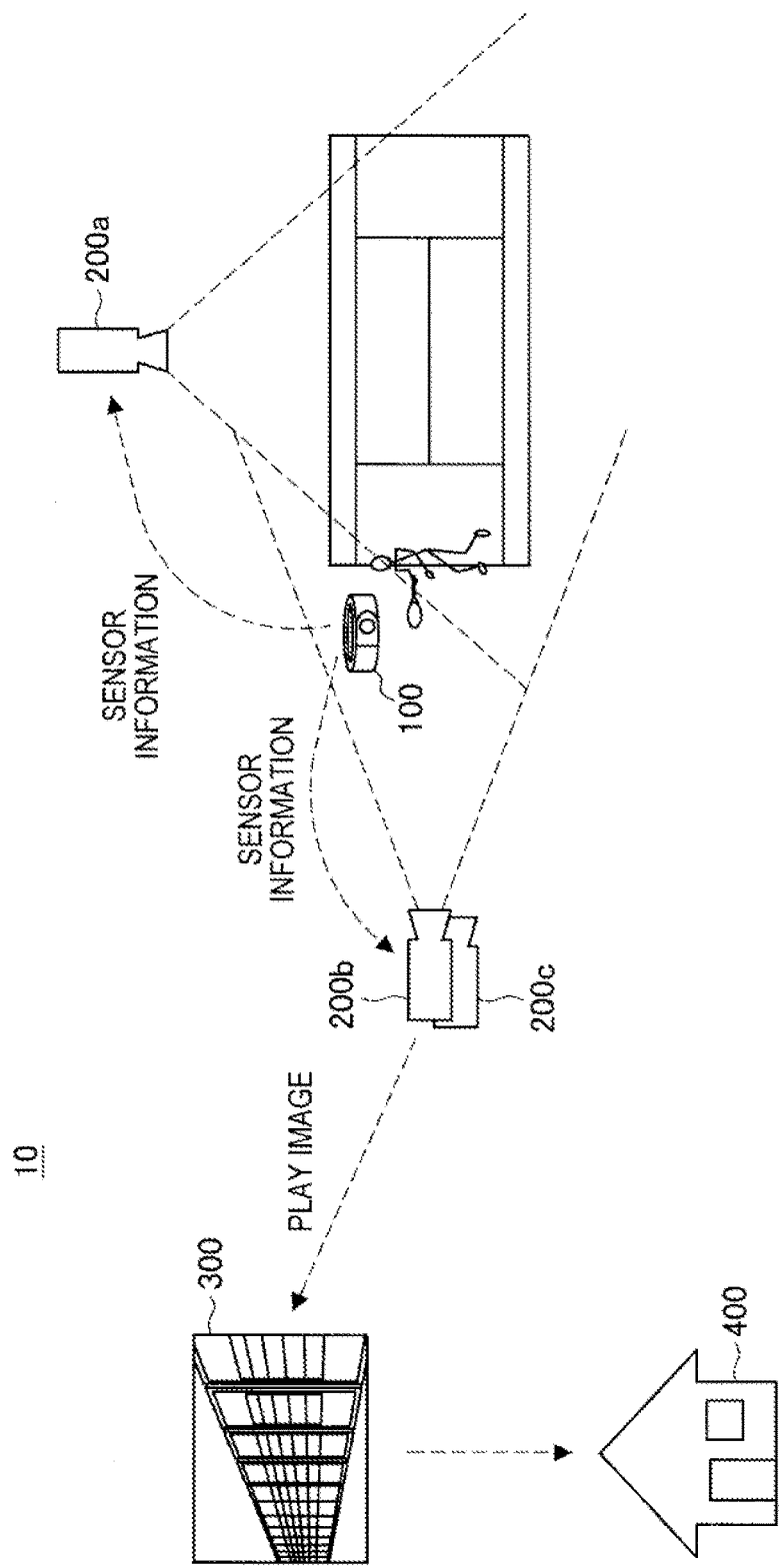

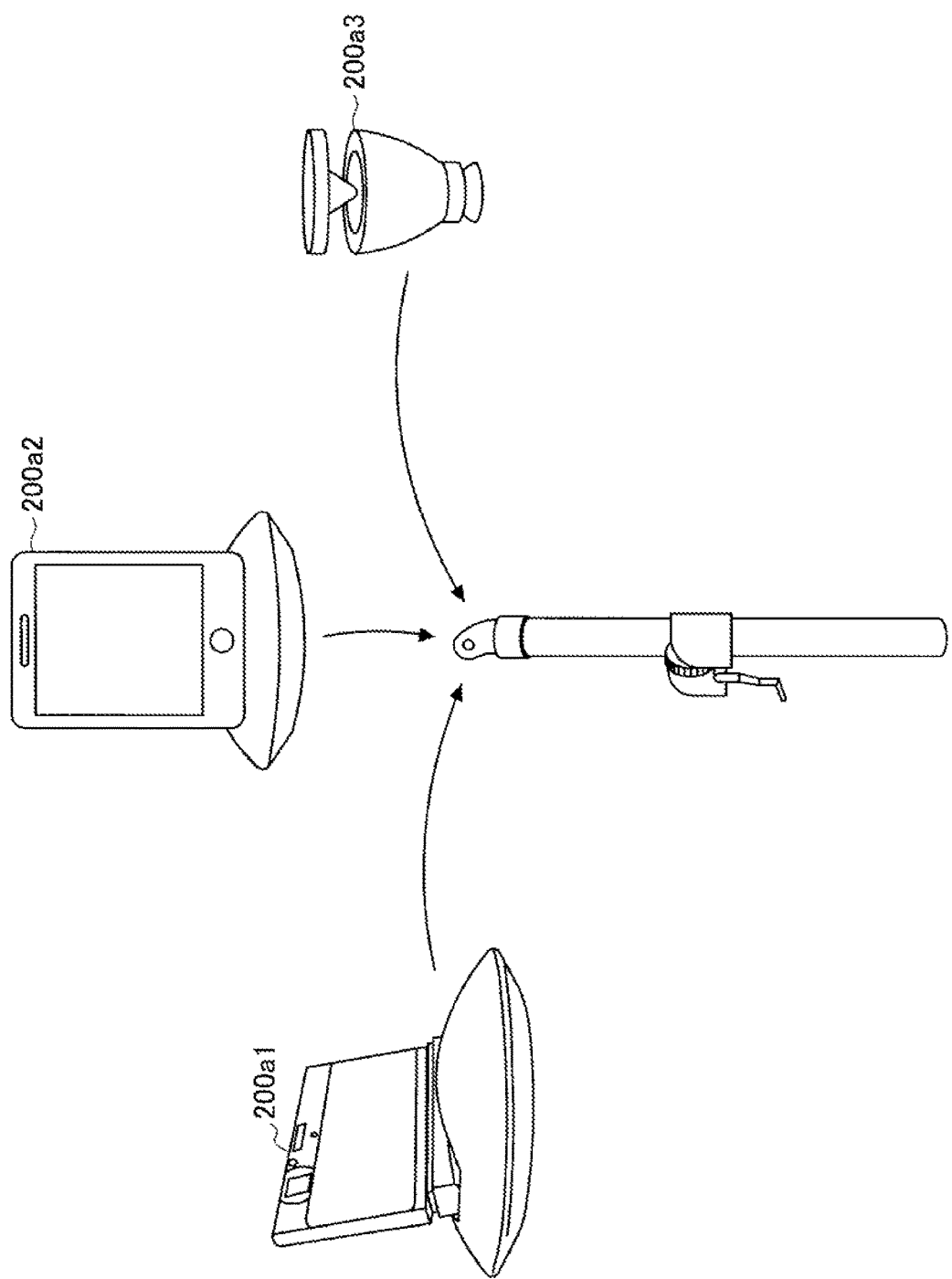
[Fig. 2]

[Fig. 3]
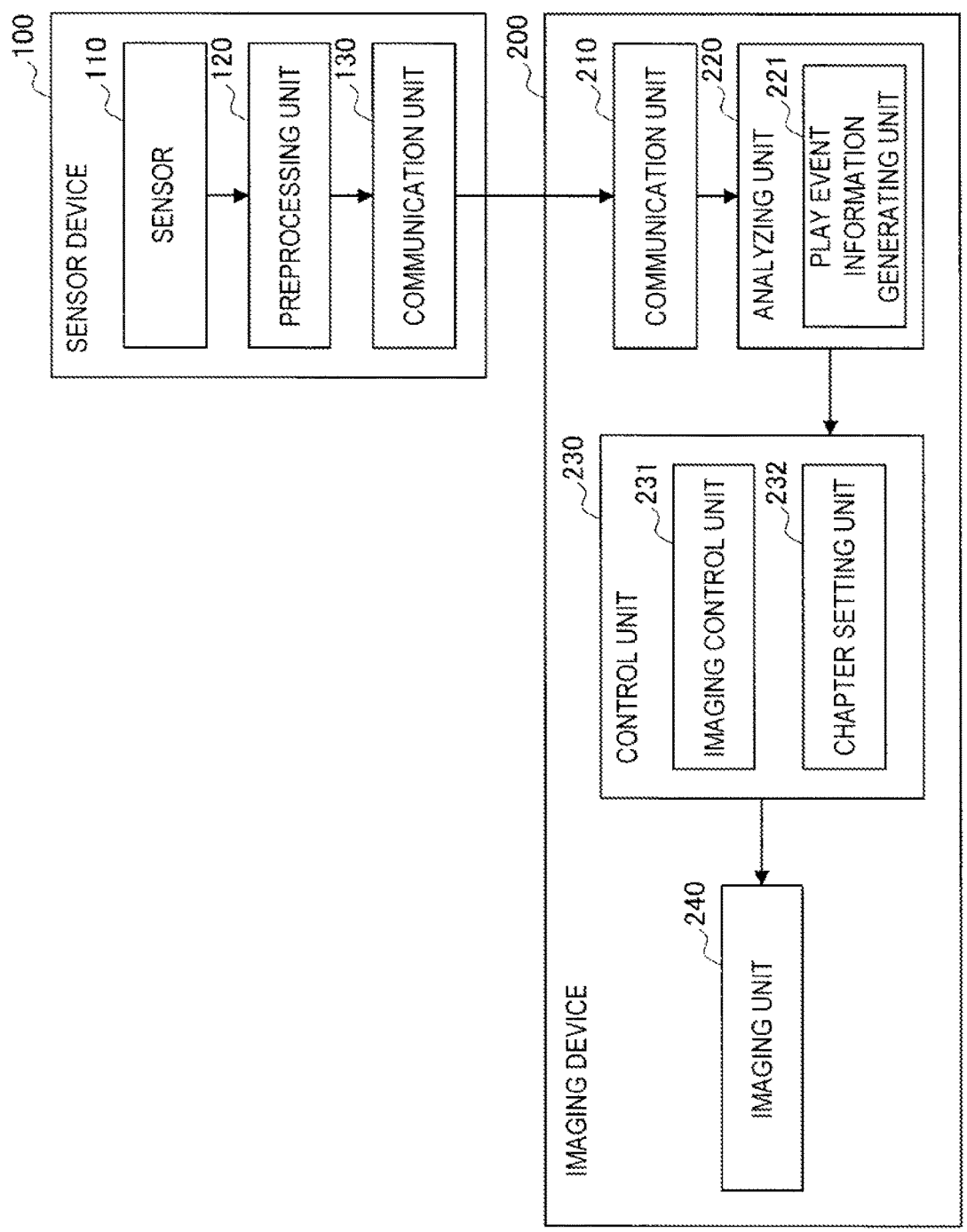

[Fig. 4]
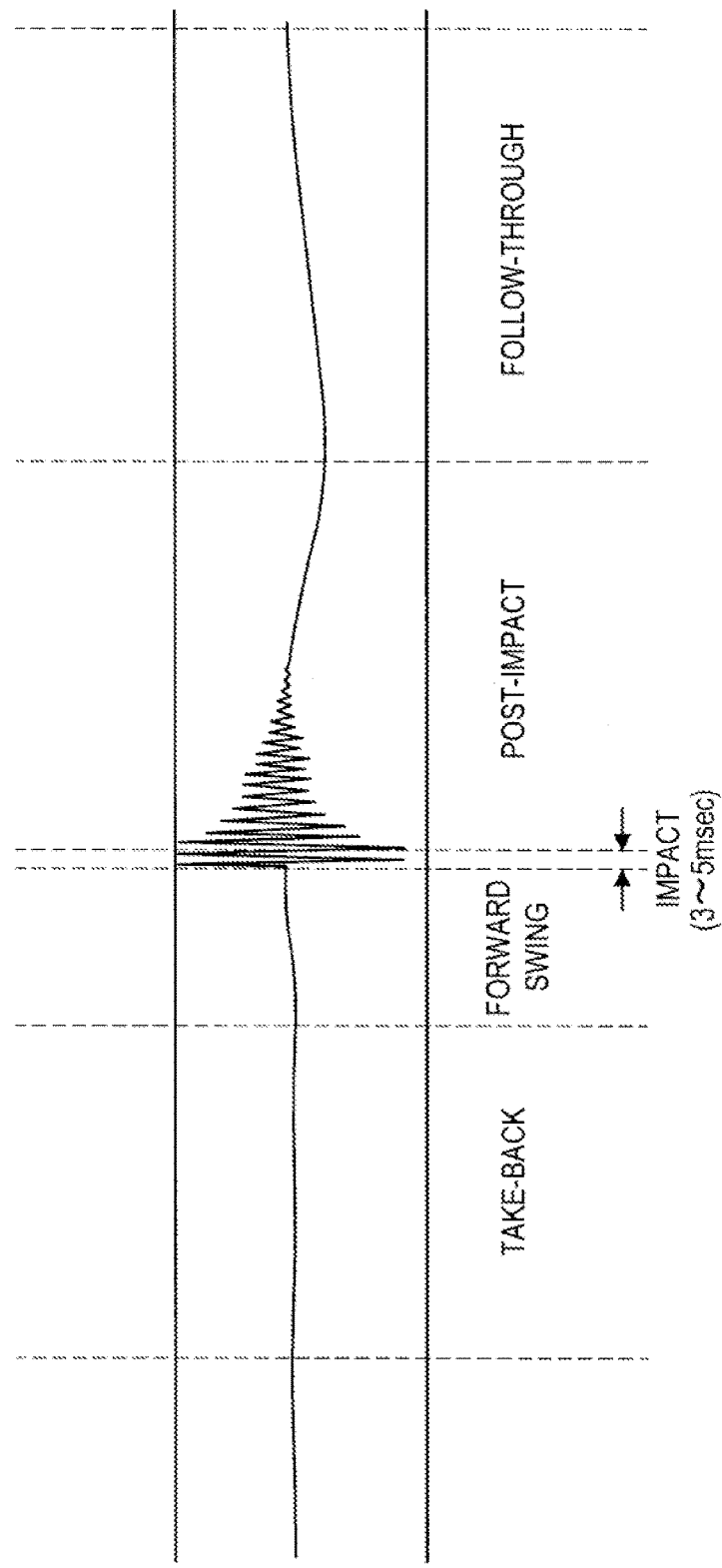

[Fig. 5]

| ITEM NAME | DESCRIPTION |
|---|---|
| SENSOR DEVICE ID | UNIQUE ID OF SENSOR DEVICE (USED TO IDENTIFY PLAYER) |
| START TIME | PLAY EVENT START TIME yy YEAR xx MONTH dd DAY hh HOUR mm MINUTE ss MILLISECOND |
| END TIME | PLAY EVENT END TIME yy YEAR xx MONTH dd DAY hh HOUR mm MINUTE ss MILLISECOND |
| PLAY EVENT TYPE | TYPES OF PLAY EVENTS |
| DETAILED INFORMATION | DETAILED DATA OF EACH EVENT |

[Fig. 6]

| PLAY EVENT TYPE | DETAILED INFORMATION |
|---|---|
| MOVEMENT IN COURT | GPS INFORMATION (LATITUDE AND LONGITUDE) →START POINT AND END POINT |
| SWING | TYPE OF SWING |
| JUMP | GPS INFORMATION (LATITUDE AND LONGITUDE) →POINT AT WHICH JUMP IS PERFORMED |
| HITTING BALL | POSITION AT WHICH BALL IS HIT →SWEET SPOT RATIO |

[Fig. 7]
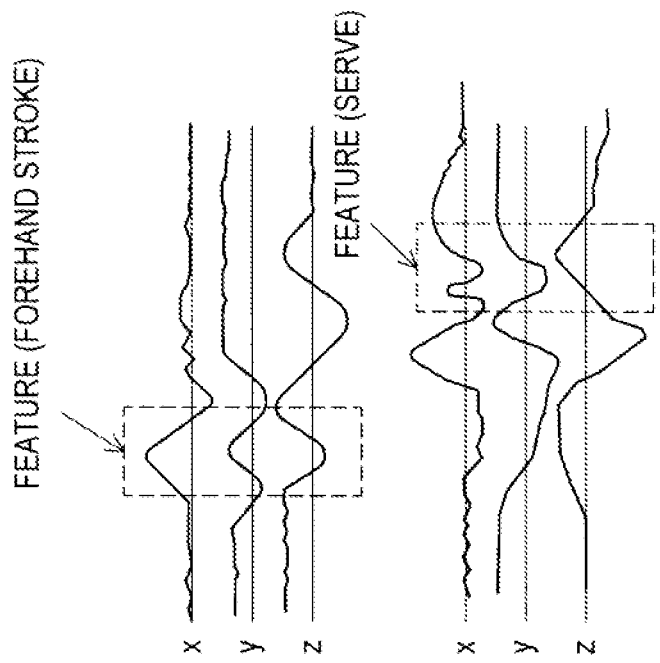
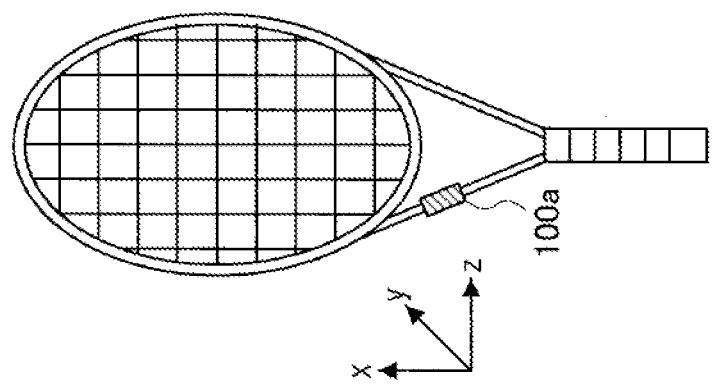

[Fig. 8]
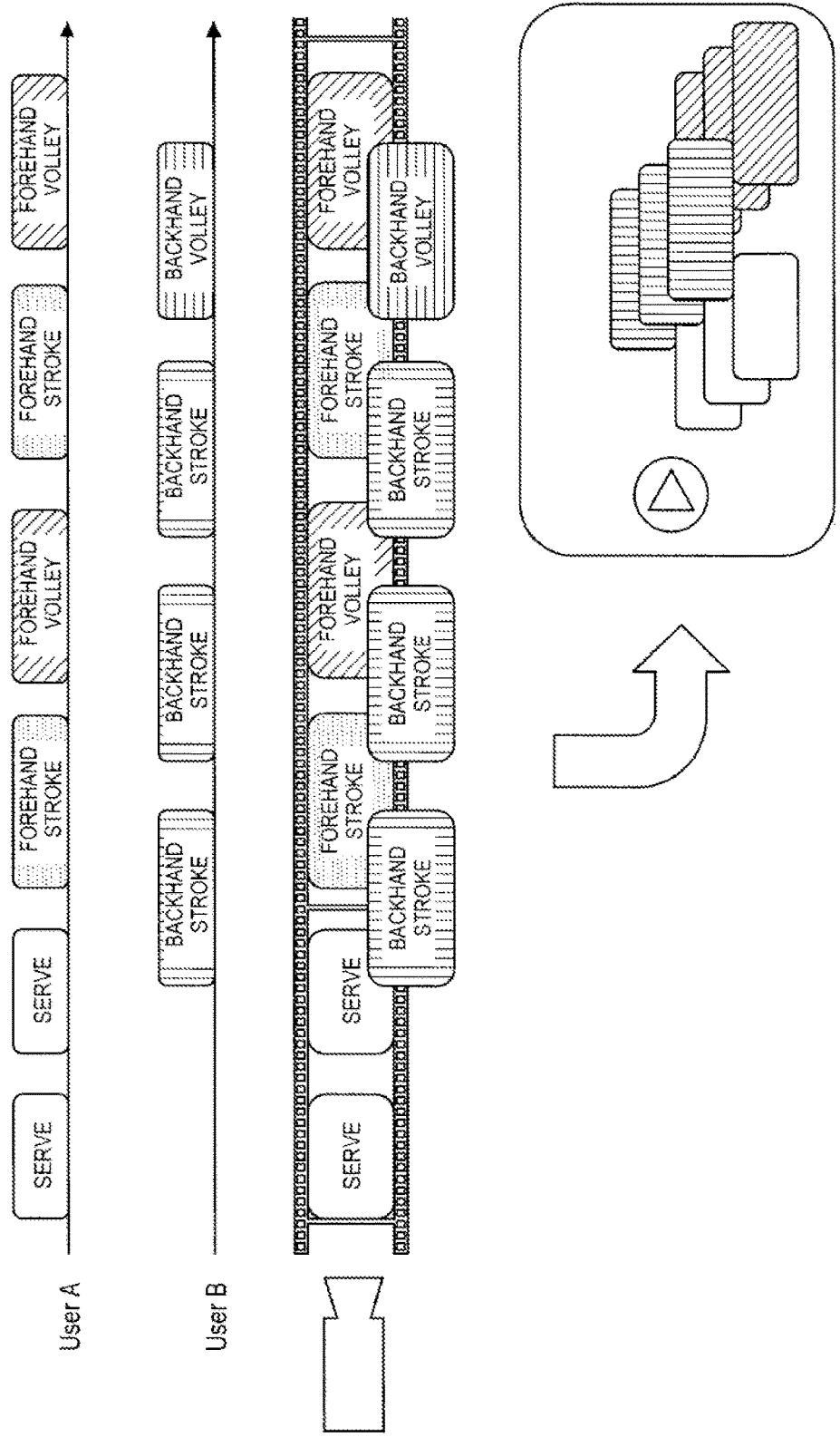

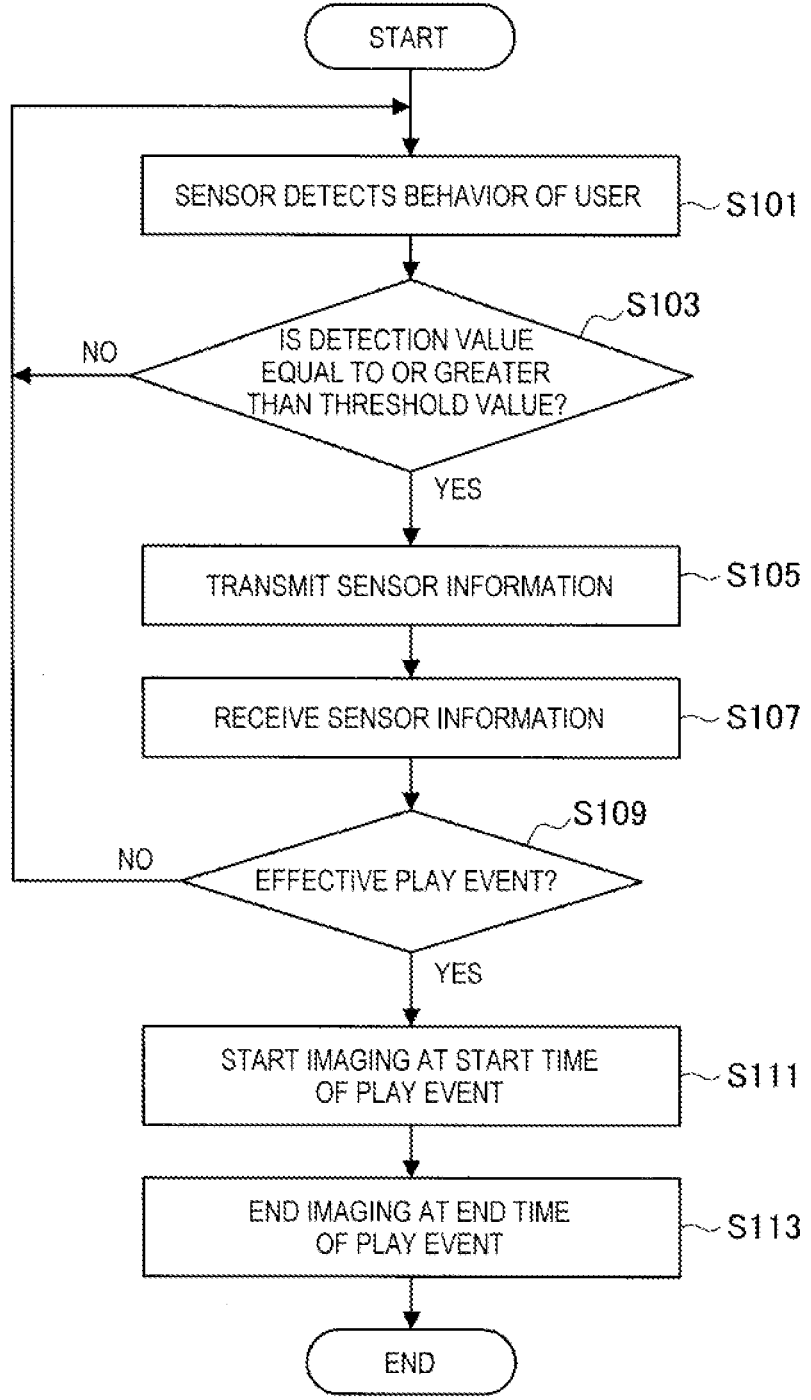
[Fig. 9]

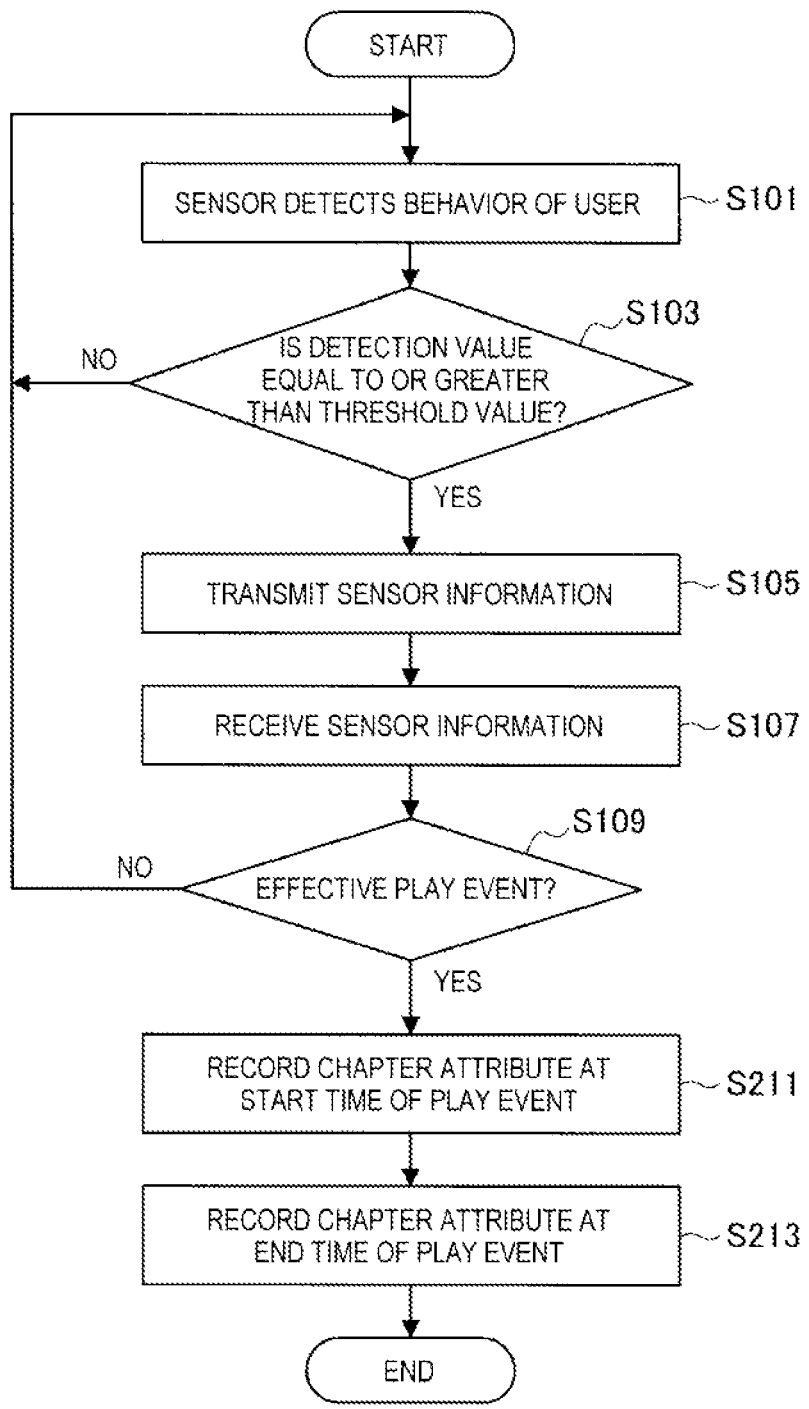
[Fig. 10]

[Fig. 11]
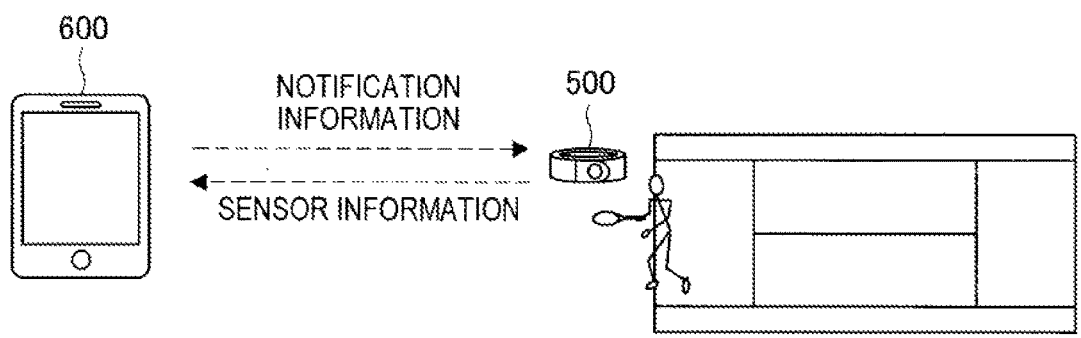

[Fig. 12]
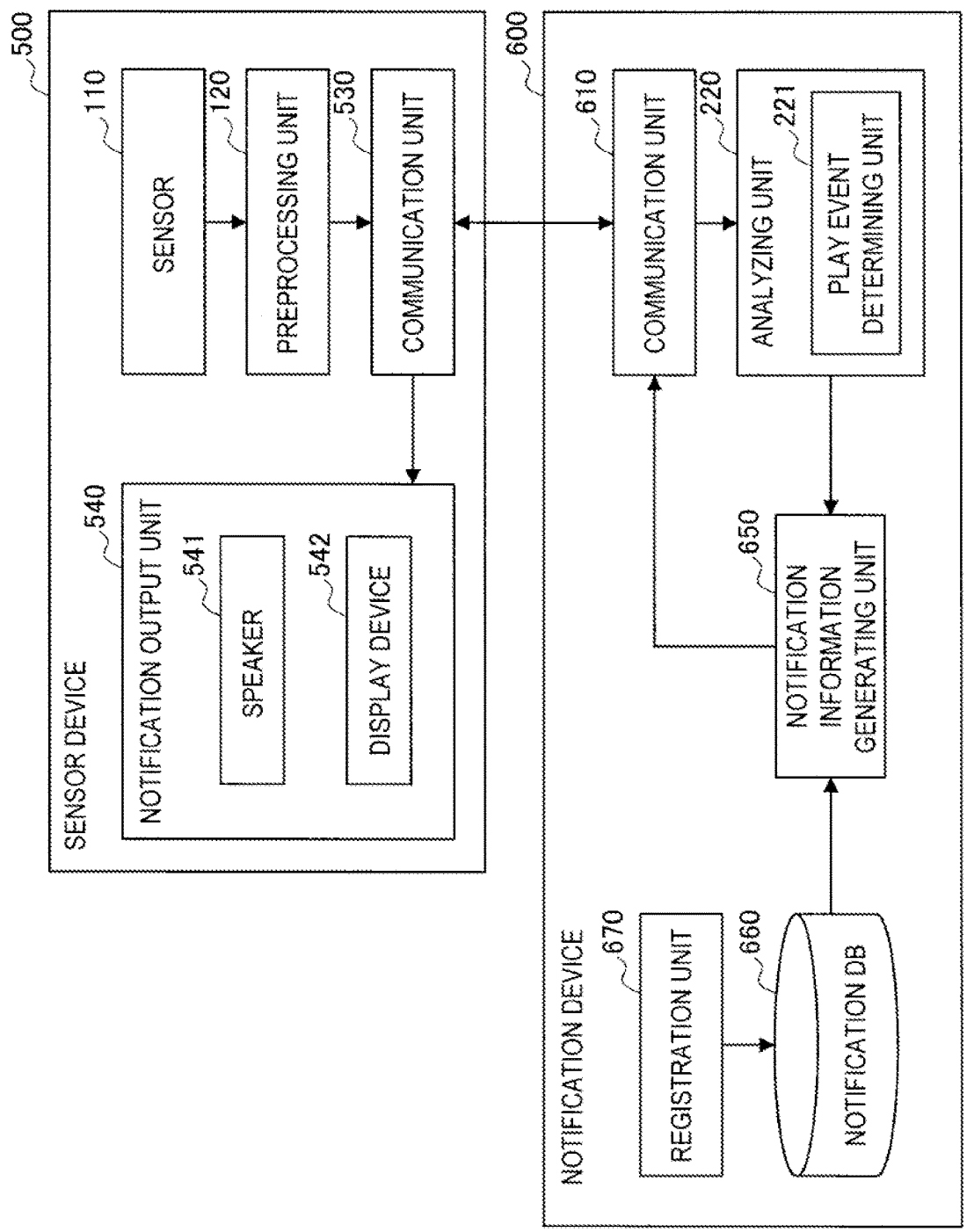

[Fig. 13]

| ITEM NAME | NOTIFICATION DEVICE | NOTIFICATION ACTION | CONDITIONS |
|---|---|---|---|
| REMIND (SERVE) | SPEAKER | "CAREFULLY TOSS" | PLAY EVENT= "SWING", DETAILED INFORMATION. SWING TYPE=SERVE, DETAILED INFORMATION. POSITION AT WHICH BALL IS HIT=OTHER THAN SWEET SPOT, AND SENSOR INFORMATION. USER POSITION=NEAR SERVICE LINE |
| REMIND (BREAK) | LED LAMP, VIBRATOR | FLASHING, VIBRATION | PREVIOUS PLAY EVENT= OTHER THAN "BREAK" PLAY EVENT= "BREAK" DOES NOT OCCUR, AND TIME FROM OCCURRENCE OF PREVIOUS PLAY EVENT ≥ 60 MINUTES |
| SUCCESS CONFIRMATION | DISPLAY DEVICE | "GOOD!" | PLAY EVENT= "SWING", DETAILED INFORMATION. SWING TYPE= STROKE, AND DETAILED INFORMATION. POSITION AT WHICH BALL IS HIT= SWEET SPOT |

[Fig. 14]
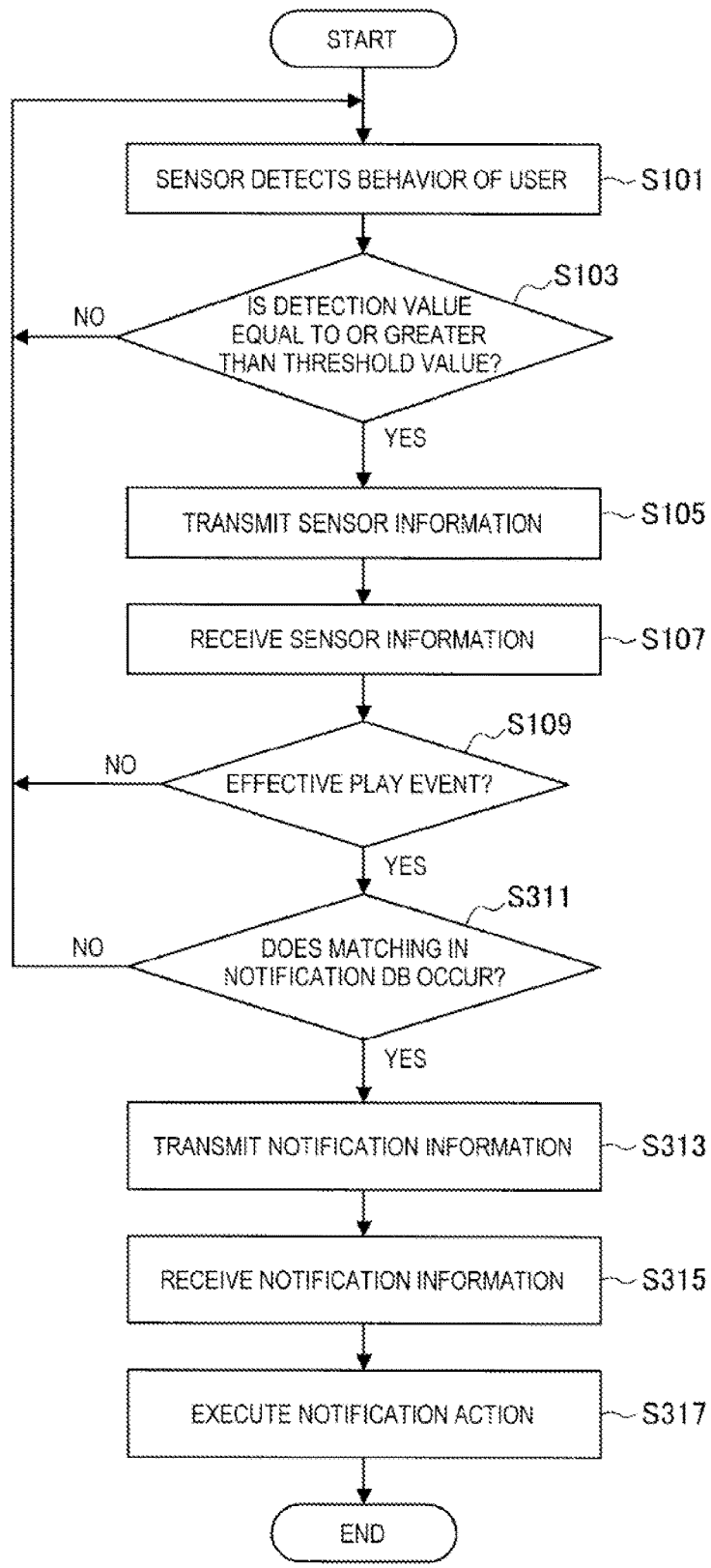

[Fig. 15]
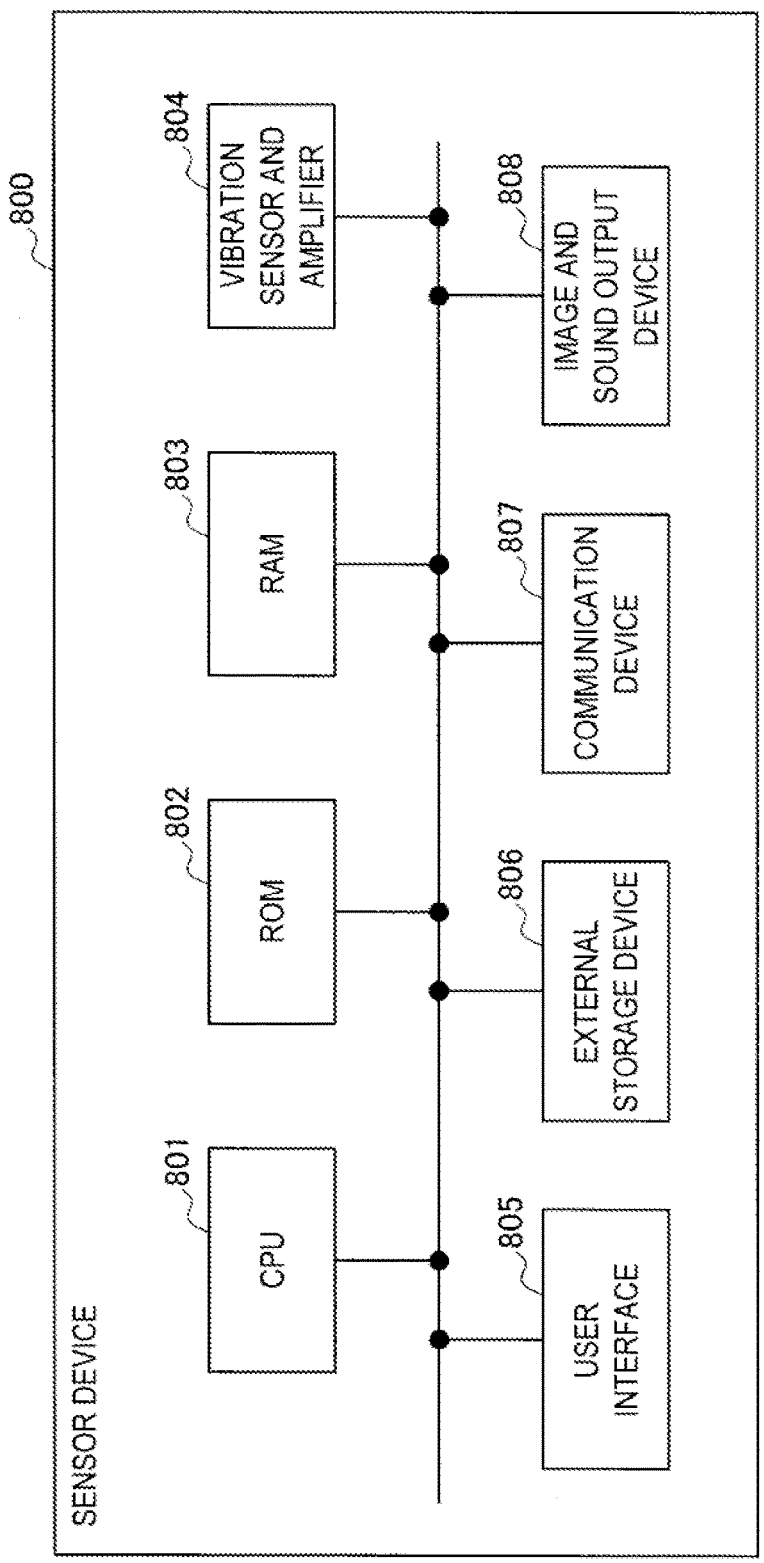

[Fig. 16]
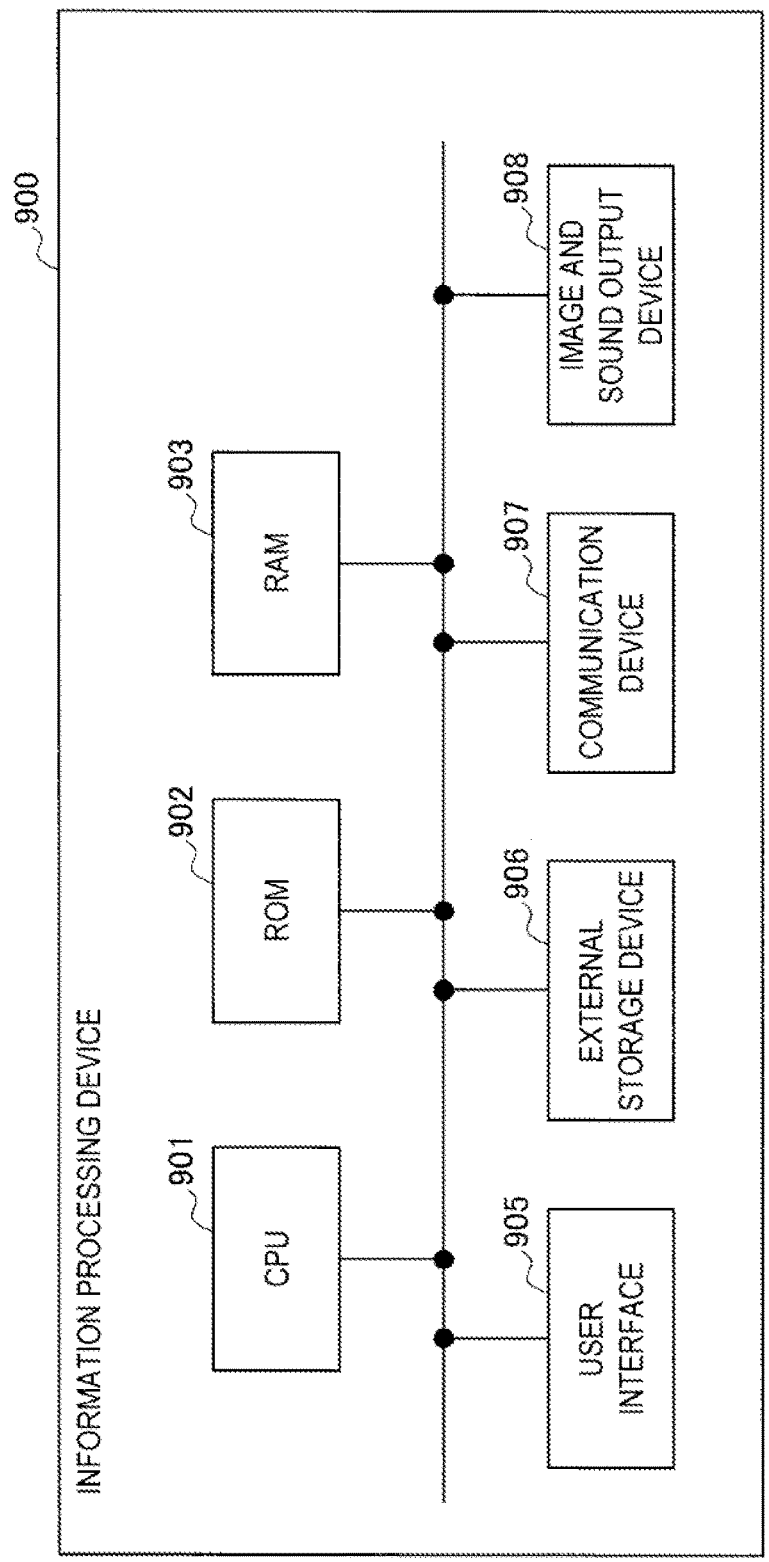

INFORMATION PROCESSING DEVICE, INFORMATION PROCESSING SYSTEM, AND PROGRAM

CROSS-REFERENCE TO RELATED APPLICATION

The present application is a national phase entry under 35 U.S.C. § 371 of International Application No. PCT/JP2013/001310 filed Mar. 4, 2013, published on Sep. 19, 2013 as WO 2013/136712 A1, which claims priority from Japanese Patent Application No. JP 2012-058421, filed in the Japanese Patent Office on Mar. 15, 2012 the entire disclosure of which is hereby incorporated herein by reference.

TECHNICAL FIELD

The present disclosure relates to an information processing device, an information processing system, and a program.

BACKGROUND ART

In order to excel at sports, it is important to objectively analyze a user's own plays and play with consciousness of improvement. Therefore, for example, processes of recording plays as still images or moving images, viewing the still images or the moving images after the plays, and comprehending improvements or the like have been widely performed. Somebody other than the user photographs the still images or the moving images in some cases. However, in many other cases, the user photographs himself or herself, that is, performs so-called self-photographing.

In such cases, for example, when portions in which a specific user is imaged or portions in which the user plays a specific action can be extracted from the contents of the still images or the moving images, the user can review the plays in a short time to comprehend improvements. That is, when scenes desired by the user can be detected automatically from the contents, searchability of the contents can be improved and the contents can be efficiently utilized for proficiency of the plays.

A technology for automatically detecting scenes desired by a user from contents has already been suggested for commercial contents such as relay broadcast of professional sports. For example, Patent Literature 1 discloses a technology for automatically detecting scenes (highlight scenes) interesting users by learning which is based on feature amounts of images or sounds of contents.

Citation List

Patent Literature

[PTL 1]
JP 2011-223287A

SUMMARY

Technical Problem

However, it is not easy to apply the technology disclosed in Patent Literature 1 to contents photographed by a user for the proficiency of sports of the user himself or herself. For example, in the case of contents of a soccer match, according to the above-mentioned technology, the feature amounts of images indicating the lines of a field or the trajectories of a ball or the feature amounts of sounds indicating whistles or exultant shouts are extracted and learned to detect highlight scenes. In a case of contents photographed by a user, however, the contents are photographed at various playing places and there are no whistles or exultant shouts in many cases. Further, for example, the contents may include clearly unnecessary scenes such as a scene in which a user goes to gather balls that have left a court. Accordingly, learning the feature amounts is more difficult and less efficient than in commercial contents.

Therefore, for example, a technology for detecting scenes desired by a user is necessary for contents photographed by a user for proficiency of sports of the user himself or herself in accordance with a method different from that of the above-mentioned technology. Accordingly, the present disclosure provides a novel and improved information processing device, a novel and improved information processing system, and a novel and improved program that enables users to comprehend play states of sports with more accuracy.

Solution to Problem

According to an embodiment of the present disclosure, there is provided an information processing device including a control unit to generate play event information based on a determination whether detected behavior of a user is a predetermined play event.

Further, according to an embodiment of the present disclosure, there is provided a system including a sensor device to acquire sensor information indicating behavior of a user; and a control unit to generate play event information based on a determination whether detected behavior of a user is a predetermined play event.

Further, according to an embodiment of the present disclosure, there is provided an information processing method including generating, by a processor, play event information based on a determination whether detected behavior of a user is a predetermined play event.

Further, according to an embodiment of the present disclosure, there is provided a non-transitory recording medium recorded with a program executable by a computer, the program including generating play event information based on a determination whether detected behavior of a user is a predetermined play event.

In the present technology, play events are defined as units of actions having meaning in sports plays. Although this will be described in detail, for example, in tennis, "movements in a court," "swings," "jumps," "hitting a ball," and the like can be defined as the play events. When occurrence of the play events is detected and play event information corresponding to the detected play events is generated, for example, the play states of the sports played by users can be comprehended as units of actions having some meaning for the users.

Advantageous Effects of Invention

According to the embodiments of the present disclosure described above, users are able to comprehend the play states of the sports played by the users with more accuracy.

BRIEF DESCRIPTION OF DRAWINGS

FIG. 1 is a diagram illustrating the overview of an information processing system according to a first embodiment of the present disclosure.

FIG. 2 is a diagram illustrating an installation example of an imaging device according to the first embodiment of the present disclosure.

FIG. 3 is a block diagram illustrating the schematic functional configurations of a sensor device and an imaging device according to the first embodiment of the present disclosure.

FIG. 4 is a diagram illustrating an example of play event detection according to the first embodiment of the present disclosure.

FIG. 5 is a diagram illustrating an example of play event information generated in the first embodiment of the present disclosure.

FIG. 6 is a diagram illustrating an example of the detailed information of a play event generated in the first embodiment of the present disclosure.

FIG. 7 is a diagram illustrating an example of setting of types of swings as the detailed information of a play event generated in the first embodiment of the present disclosure.

FIG. 8 is a diagram illustrating a use example of the play event information according to the first embodiment of the present disclosure.

FIG. 9 is a diagram illustrating an example of the flow of a process of imaging a play image in an interval of a predetermined play event according to the first embodiment of the present disclosure.

FIG. 10 is a diagram illustrating an example of the flow of a process of setting a chapter in a captured moving image according to the first embodiment of the present disclosure.

FIG. 11 is a diagram illustrating the overview of a system according to a second embodiment of the present disclosure.

FIG. 12 is a block diagram illustrating the schematic functional configurations of a sensor device and a notification device according to the second embodiment of the present disclosure.

FIG. 13 is a diagram illustrating examples of a notification DB set in the second embodiment of the present disclosure.

FIG. 14 is a diagram illustrating an example of the flow of a process of providing notification information to a user according to the second embodiment of the present disclosure.

FIG. 15 is a diagram illustrating an example of a hardware configuration of the sensor device according to an embodiment of the present disclosure.

FIG. 16 is a diagram illustrating an example of a hardware configuration of an information processing device according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First Embodiment
1-1. System Configuration
1-2. Device Configuration
1-3. Example of Play Event Detection
1-4. Example of Play Event Information
1-5. Use Example of Play Event Information
1-6. Example of Processing Flow
1-7. Summary of Embodiment
2. Second Embodiment
2-1. System Configuration
2-2. Device Configuration
2-3. Example of Notification DB
2-4. Example of Processing Flow
2-5. Summary of Embodiment
3. Third Embodiment
4. Other Embodiments
5. Hardware Configuration
6. Supplement 1. First Embodiment First, a first embodiment of the present disclosure will be described with reference to FIGS. 1 to 10. In the first embodiment of the present disclosure, play event information is used in imaging of play images or setting of additional information.

(1-1. System Configuration)

FIG. 1 is a diagram illustrating the overview of an information processing system according to the first embodiment of the present disclosure. An information processing system 10 includes a sensor device 100, an imaging device 200, and a server 300.

(Sensor Device)

The sensor device 100 is mounted on a user who is playing a sport or a sports implement which a user uses. When the sensor device 100 is mounted on a user, for example, the sensor device 100 with a bracelet shape may be directly mounted on the body of the user, as in the drawing. Further, when the sensor device 100 is mounted on a sports implement (for example, a racket, clothing, shoes, or a wristband in a case of tennis), the sensor device 100 may be wound around a shaft portion or the like, may be stitched or attached to a cloth, or may be included in advance within the implement.

Here, the sensor device 100 acquires sensor information indicating a behavior of the user who is playing a sport. The behavior of the user indicated by the sensor information may be, for example, a physical motion (position, velocity, acceleration, or the like) of the user or the implement. For example, the sensor device 100 includes at least one sensor to acquire the sensor information. The sensor detects, for example, acceleration, angular velocity, vibration, temperature, time, or a position (for example, a position on a surface of the ground indicated by latitude and longitude or a relative position corresponding to a court or the like). For example, the sensor device 100 transmits the sensor information acquired in this way to the imaging device 200.

(Imaging Device)

The imaging device 200 images a sports play image. The play image is an image in which a user who is playing a sport is shown at least in a portion thereof and may be a still image or a moving image. For example, the imaging device 200 is installed on the periphery of a court or the like in which the user is playing the sport and images a play image. At this time, the imaging device 200 detects occurrence of a play event in the sport which the user is playing based on the sensor information received from the sensor device 100, generates play event information corresponding to the play event in the sport, and controls the imaging of the play image based on the play event information. The imaging device 200 may upload the captured play image to the server 300.

Here, for example, the imaging device 200 determines at least one of the start and end of the imaging of the play image based on the play event information. Thus, for example, the play image including only a scene of a play event designated in advance by the user can be generated.

For example, the imaging device 200 sets additional information such as chapter information to the play image based on the play event information. Thus, for example, when the user views the play image, the user can easily search for the scene of a desired play event.

The plurality of imaging devices 200 may be installed. In the illustrated example, three imaging devices 200a to 200c are installed. In this case, play images captured by the imaging device 200a to 200c may be selected based on the play event information. More specifically, for example, the imaging devices 200a to 200c may each receive the sensor information from the sensor device 100, generate the play event information, and control the imaging of the play images based on the play event information. Further, one of the imaging devices 200a to 200c may receive the sensor information from the sensor device 100, serve as a host, and control the imaging of the other devices. Thus, for example, the play image is captured by the imaging device 200 located at the most suitable angle with respect to each play event. Alternatively, an image captured at the most suitable angle with respect to each play event is selected from the play images captured by the imaging devices 200.

The imaging device 200 may also, for example, image a court or the like in which a sport is being played in a panoramic way, as in the imaging device 200a in the illustrated example. In this case, the imaging device 200a can also function as a sensor device. For example, the imaging device 200a may provide a captured image or position information of a user court or the like obtained by analyzing an image as the sensor information to the imaging devices 200b and 200c.

In the above-mentioned example, three imaging devices 200 are installed. However, in other embodiments, one imaging device 200 may be installed, or two imaging devices or four or more imaging devices may be installed.

(Server Device)

The server 300 can acquire the play images captured by the imaging devices 200 as videotaped contents. The server 300 may store the acquired play images and provide the play images when a client 400 downloads the play images. Thus, a user can view the play images of the user himself or herself in his or her house or the like after the play. Of the functions of the above-described imaging device 200, the functions other than the function of practically capturing the play images may be performed by the server 300 instead. That is, the server may communicate not only the imaging devices 200 but also the sensor device 100 and control the imaging devices 200 based on the sensor information received from the sensor device 100.

(Example of Method of Installing Imaging Device)

FIG. 2 is a diagram illustrating an installation example of an imaging device according to the first embodiment of the present disclosure. In this embodiment, as described above, the imaging device 200 that captures an image of the user who is playing a sport is installed. The imaging device 200 may be, for example, a digital camera fixed to a cradle, as in an imaging device 200a1 shown in the drawing. Further, the imaging device 200 such as a portable telephone (smart phone) having an imaging function may be a device fixed to a cradle, as in the shown imaging device 200a2. Furthermore, the imaging device 200 may be an omnidirectional camera module such as an imaging device 200a3 shown in the drawing.

For example, in tennis, the imaging device 200 may be mounted on a support pillar of a court, as shown in the drawing. Since the relative position of the imaging device with respect to the court of the support pillar is determined, it is relatively easy to identify the position of a player within the court from the image captured by the imaging device 200 mounted on the support pillar. Further, when the imaging device 200 uses a wide-angle lens or is an omnidirectional camera such as the imaging device 200a3, the entire surface of the court can be captured in a panoramic way by mounting the imaging device on the support pillar.

Thus, by appropriately disposing the imaging device 200, the result of a hit ball can be determined or a motion of a player can be determined with analysis of a moving image. An image acquired by the imaging device 200 or information regarding an analysis result of the image may be used as the sensor information indicating a behavior of a user by the imaging device 200 that detects a play event.

(1-2. Device Configuration)

FIG. 3 is a block diagram illustrating the schematic functional configurations of the sensor device and the imaging device according to the first embodiment of the present disclosure.

(Sensor Device)

The sensor device 100 includes a sensor 110, a preprocessing unit 120, and a communication unit 130. A hardware configuration realizing the functions will be described later.

The sensor 110 detects, for example, acceleration, angular velocity, vibration, temperature, time, or a position. More specifically, examples of the sensor 110 may include an acceleration sensor, an angular velocity sensor, a vibration sensor, a temperature sensor, a clock, and a global positioning system (GPS) receiver. As described above, when the imaging device 200 also function as the sensor device, the sensor 110 may be an imaging unit that captures an image to acquire position information in a user court or the like.

The preprocessing unit 120 performs preprocessing on data detected by the sensor 110. Examples of the preprocessing include amplifying the detected data and filtering data equal to or less than a threshold value. Further, when the sensor 110 is the imaging unit, the preprocessing unit 120 may perform image processing to specify the position of the user. Further, data may not necessarily pass through the preprocessing unit 120 and be supplied to the communication unit 130 depending on a type of sensor 110.

The communication unit 130 is a communication module that transmits the data provided from the preprocessing unit 120 (or the sensor 110) as sensor information to the imaging device 200. When the sensor information is transmitted, for example, wireless communication is used. The communication method is not particularly limited. For example, when the imaging device 200 is located near the sensor device 100, Bluetooth (registered trademark), a wireless local area network (LAN), or the like can be used. Further, when the imaging device 200 is separated from the sensor device 100 or transmits the sensor information to the server 300, the Internet or the like may be used.

(Imaging Device)

The imaging device 200 includes a communication unit 210, an analyzing unit 220, a control unit 230, and an imaging unit 240. A hardware configuration realizing the functions will be described later.

The communication unit 210 is a communication module that receives the sensor information transmitted from the sensor device 100. As described above with the sensor device 100, short range wireless communication such as Bluetooth (registered trademark) or a wireless LAN may be used to transmit and receive the sensor information. The communication unit 210 provides the received sensor information to the analyzing unit 220. In this embodiment, the communication unit 210 corresponds to a sensor information acquiring unit that acquires the sensor information. As another example, the sensor information acquiring unit may be an interface that internally acquires the sensor information from a separately installed communication device or another unit of the imaging device 200.

The analyzing unit 220 analyzes the sensor information provided from the communication unit 210 and provides the analysis result to the control unit 230. The analyzing unit 220 includes a play event information generating unit 221. The play event information generating unit 221 detects occurrence of a play event in a sport based on the sensor information and generate play event information corresponding to the play event.

Here, as described above, the play event is defined as a unit of an action having some meaning in the play of a sport. For example, in the case of tennis, "movements in a court," "swings," "jumps," "hitting a ball," and the like can be defined as the play events. The play event information generating unit 221 detects the occurrence of a play event defined in advance by analyzing the sensor information through mechanical learning, pattern recognition, or the like. Further, the play event information generating unit 221 adds detailed information regarding the play event to the play event in which the occurrence thereof is detected, for example, also referring to the sensor information, as necessary, and generates the play event information. A specific example of the detection of the play event or the play event information will be described later.

The control unit 230 controls the operation of the imaging device 200 based on the play event information which is the analysis result provided from the analyzing unit 220. In this embodiment, the control unit 230 includes an imaging control unit 231 and a chapter setting unit 232.

The imaging control unit 231 controls imaging the play image captured by the imaging unit 240 based on the play event information. For example, the imaging control unit 231 determines at least one of start and end of the imaging of the play image as a moving image captured by the imaging unit 240 based on the play event information. More specifically, when occurrence of a predetermined play event is detected, the imaging control unit 231 controls the imaging unit 240 such that the play image is captured in the interval of the predetermined play event.

The imaging control unit 231 may select the play images captured by the plurality of imaging devices based on the play event information. When the play images are captured by the plurality of imaging devices 200, as described above, the imaging control unit 231 of each imaging device 200 may cause the imaging unit 240 to capture the play image when the angle of the imaging device itself is suitable for the detected play event. Further, the imaging control unit 231 of one of the imaging devices 200 may control the imaging units 240 of the other imaging devices 200 such that the imaging device 200 located at the most suitable angle with respect to the play event captures the play image. Alternatively, the imaging control unit 231 of one of the imaging devices 200 may select an image at the most suitable angle with respect to each play event from the play images captured by the imaging devices 200.

On the other hand, the chapter setting unit 232 sets chapter information corresponding to the play event to the play image captured by the imaging unit 240 based on the play event information. The chapter information is information that defines a reproduction interval of a moving image based on, for example, a reproduction time, when the play image is the moving image. By setting the chapter information, the user can skip or return to the reproduction in a chapter unit when the user views the play image. Accordingly, the user can jump to a desired play event portion or repeatedly view a desired play event portion.

In this embodiment, the chapter setting unit 232 corresponds to an additional information setting unit that sets additional information to the play image. As another example, the additional information setting unit may add, to the play image, information used to display a caption showing a specific play event in the interval corresponding to the specific play event of the play image or an interval previous to this interval. For example, when the play image is a still image, the additional information setting unit may add, to the still image, information regarding a caption showing the play event.

The imaging unit 240 includes an imaging element or lens that captures an image and a driving circuit. The imaging unit 240 captures the play image under the control of the control unit 230. For example, data of the captured play image may be transmitted from the communication unit 210 to the server 300 (not shown in FIG. 2). Alternatively, the data of the captured play image may be stored in a storage unit of the imaging device 200.

(1-3. Example of Play Event Detection)

FIG. 4 is a diagram illustrating an example of play event detection according to the first embodiment of the present disclosure. In the illustrated example, the play event information generating unit 221 of the imaging device 200 detects a tennis swing using vibration of a racket used by the user as the sensor information.

In the illustrated example, the swing includes actions of take-back, forward-swing, impact, post-impact, and follow-through. In this embodiment, a play event "swing" is defined as a series of actions from the take-back to the follow-through. As shown in the exemplary vibration waveform, the vibration of the racket is generated in the action of the impact and is attenuated during the action of the post-impact.

In this case, the play event information generating unit 221 first detects the vibration of the racket generated in the interval of the impact based on sensor information of the vibration sensor (the sensor 110) included in the sensor device 100 mounted on the racket. The play event information generating unit 221 specifies that the vibration represents a swing in consideration of the attenuated waveform of the subsequent vibration. That is, here, the play event information generating unit 221 detects that the play event "swing" is generated.

The play event information generating unit 221 determines the vibration generation start point as a start point of an impact, determines the interval of 3 to 5 milliseconds from the start point as the impact, and defines the intervals of the take-back, the forward-swing, the post impact, and the follow-through before and after the impact. All of the intervals are the interval of the play event "swing." The play event information generating unit 221 may include the start time and the end time of the interval in the play event information to be described below.

Here, the length of each of the intervals of the take-back, the forward-swing, the impact, the post-impact, and the follow-through may be set in advance based on, for example, the data of a general swing. The setting value may be, for example, a fixed value or may be a relative value in accordance with the amplitude or length of the vibration.

(1-4. Example of Play Event Information)

FIG. 5 is a diagram illustrating an example of the play event information generated in the first embodiment of the present disclosure. In the illustrated example, the play event information includes a sensor device ID, a start time, an end time, a play event type, and detailed information.

The sensor device ID is information used to identify the sensor device 100 that transmits the sensor information basically used to detect the play event. For example, when a plurality of players each mount the sensor device 100 and the sensor information indicating behaviors of the plurality of users is received by the communication unit 210, the user corresponding to the play event can be specified by identifying the sensor device 100 based on the sensor device ID. For example, the media access control (MAC) address or the like of the sensor device 100 may be used as ID information. Further, when only one sensor device 100 is present, the information regarding the sensor device ID may be omitted.

Information regarding the start time and the end time is used to specify the times of the start and the end of the play event. For example, when a play event of the "swing" shown in FIG. 4 occurs, the times of the start point of the take-back and the end point of the follow-through can be recorded as the start time and the end time, respectively. Since the play event can occur in units of seconds or milliseconds as in this example, the start time and the end time are recorded at least in units of seconds and are preferably recorded in units of milliseconds. For example, the start time and the end time may be specified based on time information added when the sensor device 100 transmits the sensor information or may be specified based on time information added when the imaging device 200 receives the sensor information.

The play event type is information that indicates a type of play event. The detailed information includes detailed data for each play event. For example, in the case of tennis, the types of play events such as "movement in a court," "swing," "jump," and "hitting a ball" can be set. In this case, for example, a plurality of types of play events such as actions of "swing" while "jumping" and "hitting a ball" are set in overlapping intervals in some cases. Further, the types of play events can be set variously in accordance with sports items or a preference of a player.

The detailed information is information that describes the contents of each play event in more detail. Examples of the detailed information will be described continuously with reference to FIG. 6.

FIG. 6 is a diagram illustrating examples of the detailed information of the play events generated in the first embodiment of the present disclosure. In the illustrated example, the detailed information which can be set in the play event information is shown for four types of play events, a "movement in a court," a "swing," a "jump," and "hitting a ball" occurring in tennis.

For example, when the play event of the "movement in a court" occurs, GPS information (latitude and longitude) is recorded as the detailed information. For example, the GPS information may be recorded as information indicating the start point and the end point of a movement. Further, the information can be acquired practically, for example, when the accuracy of the GPS is improved, for example, using a quasi-zenith satellite.

Further, in the play event of the "swing," a type of swing is recorded as the detailed information. The detection of the type of swing will be described later with reference to FIG. 7. In the play event of the "jump," GPS information (latitude and longitude) is recorded as information regarding a position at which the jump is performed. In the play event of "hitting a ball," a position at which a ball is hit against a racket is recorded as the detailed information. A sweet spot ratio (a ratio at which a ball is hit at a sweet spot (which is a spot at which the vibration of the racket is the minimum)) may be calculated from the ball-hit position and may be recorded as the detailed information. The ball-hit position can be detected, for example, from information regarding the vibration of a racket.

Thus, by setting the detailed information in each play event, detailed control can be performed in accordance with a desire of the user, for example, when imaging play images is controlled based on the play event information. Further, when additional information regarding the play event is set to the play image, not only the types of events but also various types of information can be added, and thus, can be valuable, for example, to the proficiency of a sport for the user.

For example, unnecessary play events such as "going to gather balls that have left a court," "break," and "small talk" can also be set as the play images (for example, to stop capturing a play image in the unnecessary play events or skip the unnecessary play events at the time of reproducing the play images). For example, the detailed information may not be set in such unnecessary play events.

FIG. 7 is a diagram illustrating an example in which types of swings are set as the detailed information of a play event generated in the first embodiment of the present disclosure. In the illustrated example, the sensor device 100a is mounted on a shaft portion of a racket. The sensor device 100a includes a triaxial acceleration sensor that can detect acceleration along each of x, y, and z axes as the sensor 110.

In this case, when a user swings a racket, waveforms unique to the type of swing are shown in time-series data of the acceleration. For example, the features of a forehand stroke and a serve are shown in the drawing (further, the waveforms shown in the drawing may not necessarily be observed depending on the position at which the sensor device 100a is mounted, the performance of the acceleration sensor, or the like). The type of swing can be identified by characterizing the time-series data of the acceleration by a vector and combining the time-series data with an identifying dictionary registered in advance. A method of general mechanical learning may be used to identify the type of swing. For example, the k-NN method or a support vector machine can also be used. Examples of the types of swing include a forehand stroke, a forehand volley, a forehand slice, a backhand stroke, a backhand slice, a backhand volley, a serve, and a smash.

Thus, the type of swing can be set in the detailed information regarding the play event "swing." The detailed information can also include information acquired using various known technologies according to a desire of the user.

(1-5. Use Example of Play Event Information)

FIG. 8 is a diagram illustrating a use example of the play event information according to the first embodiment of the present disclosure. In the illustrated example, User A and User B play tennis User A and User B both mount the sensor device 100. One imaging device 200 images play situations as play images.

In this case, for example, the imaging device 200 can generate play event information at each chance of a swing of each of User A and User B. In the drawing, the generated play event information is shown in a time series for each of User A and User B. Swings described in the play events are types of swings specified as the detailed information.

By setting the play event information for each user, for example, the plays of User A and User B can be extracted or searched for from the play images in which the plays of User A and User B are alternately photographed. Further, by setting the types of swings as the detailed information, for example, scenes in which the strokes (which may be volleys, serves, or the like) are photographed can be extracted or searched for irrespective of User A and User B. Furthermore, when other detailed information such as a position at which a ball is hit is set in the play event "swing," the scenes of the play images can be extracted or searched for based on other detailed information.

(1-6. Example of Processing Flow)

(Imaging Control)

FIG. 9 is a diagram illustrating an example of the flow of a process of imaging a play image in an interval of a predetermined play event according to the first embodiment of the present disclosure.

First, the sensor 110 of the sensor device 100 detects a behavior of the user (step S101). Here, a detection value can be, for example, a measurement value of an acceleration sensor, an angular velocity sensor, a vibration sensor, or the like or position information (latitude and longitude) received by GPSs.

Next, the preprocessing unit 120 determines whether the detection value detected by the sensor 110 is equal to or greater than a predetermined threshold value (step S103). For example, when the detection value is a measurement value of an acceleration sensor, an angular velocity sensor, a vibration sensor, or the like, the preprocessing unit 120 may determine whether the magnitude, amplitude, or the like of the measurement value is equal to or greater than the threshold value. The detection value used for the determination may be subjected to a predetermined amplification process. On the other hand, when the detection value is position information received by GPSs, the preprocessing unit 120 may compare previous position information to newly detected position information and determine whether a distance between the previous position information and the newly detected position information is equal to or greater than the predetermined threshold value.

When it is determined in step S103 that the detection value is equal to or greater than the predetermined threshold value, the communication unit 130 transmits the sensor information to the imaging device 200. Here, not only the detection value detected in step S101 but also a detection value obtained by another sensor or time information may be added to the transmitted sensor information. For example, when an acceleration sensor serving as the sensor 110 detects a value equal to or greater than the predetermined value, not only a detection value detected by the acceleration sensor but also the position of the user acquired by a GPS receiver or information to which time information at the time of acquiring the detection value is added may be transmitted from the communication unit 130 to the imaging device 200.

Conversely, when it is determined in step S103 that the detection value is not equal to or greater than the predetermined threshold value, the communication unit 130 does not transmit the sensor information and the sensor device 100 returns to detect a behavior of the user again (step S101). Thus, when it is determined that the detection value is not equal to or greater than the threshold value, the sensor information is not transmitted, and consequently the power of the sensor device 100 consumed in the communication can be saved. Further, by transmitting no unnecessary sensor information, the analysis processing load of the imaging device 200 can be prevented from increasing unnecessarily.

Next, the communication unit 210 of the imaging device 200 receives the sensor information transmitted from the sensor device 100 (step S107). The communication unit 210 provides the received sensor information to the analyzing unit 220. When the time information has not yet been added to the sensor information in the sensor device 100, the time information may be added at this time.

Next, the play event information generating unit 221 of the analyzing unit 220 determines whether an effective play event occurs from the received sensor information (step S109). In this embodiment, as described above, the play event information generating unit 221 recognizes the feature of the sensor information for the predefined play event, and thus detects occurrence of the play event from the sensor information based on the feature.

Further, the "effective play event" mentioned here does not merely mean a predefined play event, but may mean a play event designated as effective among play events. For example, in a tennis, a play event "going to gather balls out of a court" may be defined, but is not an effective play event, for example, for a user who views the photographed images. Accordingly, the play event information generating unit 221 may detect the occurrence of the predefined play event "going to gather balls out of a court" from the feature of the sensor information, but may determine that this play event is not an effective play event.

When it is determined in step S109 that the effective play event occurs, the imaging control unit 231 of the control unit 230 causes the imaging unit 240 to start capturing play images from the start time of the play event (step S111). Here, a time difference between the actual start of the play event to the detection of the occurrence of the play event may be considered. In this case, the imaging unit 240 may continue the imaging and temporarily record the captured images in a buffer memory and the imaging control unit 231 may record the images after the start time of the play event among the images stored in the buffer memory as the play images.

For example, it is assumed that play event "swing" is detected at the timing of "impact" mentioned in the example of FIG. 4. In this case, the imaging control unit 231 traces back up to the intervals of the "forward swing" and the "take-back" defined beforehand, using the time of the "impact" as a reference, and records the images stored in the buffer memory.

Thereafter, the imaging control unit 231 causes the imaging unit 240 to end the imaging of the play images at the end time of the play event (step S113). For example, the end of the play event may be determined based on the sensor information, as in step S101 to step S109 described above. Alternatively, a time after a predetermined time from the start of the play event may be specified as the end of the play event according to the type or the like of play event.

(Chapter Setting)

FIG. 10 is a diagram illustrating an example of the flow of a process of setting a chapter in a captured moving image according to the first embodiment of the present disclosure.

In this example, the steps (step S101 to step S109) of detecting the play event are the same as those described above with reference to FIG. 9.

When it is determined in step S109 that an effective play event occurs, the chapter setting unit 232 of the control unit 230 records a chapter attribute indicating the start of the play event at the position corresponding to the start time of the play event of the play image captured by the imaging unit 240 (step S211).

Thereafter, the chapter setting unit 232 records a chapter attribute indicating the end of the play event at the position corresponding to the end time of the play event of the captured play image (step S213). For example, the end of the play event may be determined based on the sensor information, as in step S101 to step S109 described above. Alternatively, a time after a predetermined time from the start of the play event may be specified as the end of the play event according to the type or the like of play event.

(1-7. Summary of Embodiment)

The first embodiment of the present disclosure has been described. In this embodiment, for example, by controlling the imaging of the play images by the imaging device 200 in accordance with the play event information generated based on the sensor information, desired play images can be captured without a user being burdened with an operation of controlling the imaging in a case of so-called self-imaging or the like. When a play event is desired to be reviewed as an effective play event, the play images in which only desired portions are extracted in advance can be automatically generated. Further, even when this setting is not performed, clearly unnecessary scenes such as gathering balls can be automatically excluded from the play images. Thus, since the volume of all the play images is reduced, a communication time can be shortened, for example, when the play images are uploaded from the imaging device 200 to the server 300.

For example, by setting a chapter or the like in an image captured by the imaging device 200 in accordance with the information regarding the play event detected from the sensor information, a search property of the generated play images is considerably improved. Further, since the chapter is set in accordance with the play event, it is easy to reproduce only desired portions of the play of the user himself or herself, when the user views the play images.

In this embodiment described above, tennis has mainly been described as an example, but the sport is not limited to tennis. This embodiment is applicable to, for example, baseball. In the case of baseball, for example, the sensor device 100 can be mounted on a user himself or herself or an implement such as a bat or a glove. The play images are captured to correspond to a detected play event or a chapter is set, as in the above-described example of tennis. In the case of baseball, since a chance for one user to do plays is restricted in both offense and defense, it is possible to obtain the great advantage of easily extracting and searching for a desired scene by applying this embodiment.

This embodiment is applicable to a batting center or a golf practice field. For example, mounting the sensor device 100 on a hitting implement such as a bat or a golf club, identifying a shot suitable as a play event and a shot unsuitable as a play event, and extracting a moving image of the suitable shot and providing it to a user can be considered.

This embodiment is not limited to the above-mentioned examples, but is useful for all situations of sports for which there is a possibility for a user to review images of plays of the user himself or herself.

2. Second Embodiment

Next, a second embodiment of the present disclosure will be described with reference to FIGS. 11 to 14. In the second embodiment of the present disclosure, play event information is used to notify a user of information regarding a play.

(2-1. System Configuration)

FIG. 11 is a diagram illustrating the overview of a system according to a second embodiment of the present disclosure. An information processing system 20 includes a sensor device 500 and a notification device 600.

The sensor device 500 is mounted on a user who plays a sport, as in the sensor device 100 described above in the first embodiment. The sensor device 500 acquires sensor information and transmits the sensor information to the notification device 600, and also receives notification information from the notification device 600 and outputs the notification information to the user.

The notification device 600 generates play event information from the sensor information provided from the sensor device 500, generates notification information for the user based on the play event information, and transmits the notification information to the sensor device 500. The notification device 600 generates the play event information in the same way as the imaging device 200 described above in the first embodiment. The notification device 600 may be any device, as long as the device has a communication function and an information processing function. In the illustrated example, a portable telephone (smart phone) is used as the notification device 600.

(2-2. Device Configuration)

FIG. 12 is a block diagram illustrating the schematic functional configurations of a sensor device and a notification device according to the second embodiment of the present disclosure.

(Sensor Device)

The sensor device 500 includes a sensor 110, a preprocessing unit 120, a communication unit 530, and a notification output unit 540. A hardware configuration realizing the functions will be described later. Since the sensor 110 and the preprocessing unit 120 are the same as those described above in the first embodiment, the detailed description thereof will not be repeated.

The communication unit 530 has substantially the same configuration as the communication unit 130 described in the first embodiment. However, the communication unit 530 is different in that the communication unit 530 is used not only to transmit the sensor information to the notification device 600 but also to receive the notification information from the notification device 600.

The notification output unit 540 outputs the notification information received by the communication unit 530 to the user. For example, the notification output unit 540 may include a speaker 541 and a display device 542. The speaker 541 outputs the notification information as a sound to the user. The display device 542 outputs the notification information as an image to the user. For example, one of the speaker 541 and the display device 542 may be selected and used according to a type of notification information or both the speaker 541 and the display device 542 may be used together. The notification output unit 540 may include a lighting unit such as an LED lamp or a vibrator that vibrates the user himself or herself or an implement.

The notification information may not necessarily be output from the sensor device 500 and may be output by a separate display device or speaker. A method of outputting the notification information from the sensor device 500 is reasonable in consideration of the fact that there are many scenes in which the user individually plays a sport as application scenes of this embodiment.

(Notification Device)

The notification device 600 includes a communication unit 610, an analyzing unit 220, a notification information generating unit 650, a notification DB 660, and a registration unit 670. A hardware configuration realizing the functions will be described later. Since the analyzing unit 220 has the same configuration as the configuration described above in the first embodiment, the detailed configuration thereof will not be repeated.

The communication unit 610 has substantially the same configuration as the communication unit 210 described in the first embodiment. However, the communication unit 610 is different in that the communication unit 610 is used not only to receive the sensor information from the sensor device 500 but also to transmit the notification information to the sensor device 500.

The notification information generating unit 650 generates notification information for the user based on the play event information which is an analysis result provided from the analyzing unit 220. For example, the notification information may be information that is registered in the notification DB 660 in association with the play event in advance by the user. In this case, the notification information generating unit 650 determines whether the occurring play event is a notification information generation target, for example, by matching the types of play events. When the play event which is a notification information generating target occurs, the notification information generating unit 650 generates the notification information in accordance with information registered in the notification DB 660 and transmits the notification information to the sensor device 500 via the communication unit 610. The notification information generating unit 650 may use the sensor information received by the communication unit 610 in addition to the play event information to generate the notification information. Examples of the information registered in the notification DB 660 will be described later.

The registration unit 670 is an operation input unit that adds or corrects the information registered in the notification DB 660. For example, the registration unit 670 may provide the user with a graphical user interface (GUI) used to set the registration contents of the notification DB 660 by using a display unit or an operation unit of the notification device 600.

(2-3. Example of Notification DB)

FIG. 13 is a diagram illustrating examples of the notification DB set in the second embodiment of the present disclosure. In the illustrated example, information regarding three notifications of "remind (serve)," "remind (break)," and "success confirmation" are shown.

For example, the notification of the "remind (serve)" is performed when the user fails a serve once and performs the subsequent serve. In the notification DB 660, for example, the following conditions are set as conditions for specifying this case: (1) a play event "swing" occurs, (2) the "swing type" in the detailed information of the "swing" is a "serve," (3) the "position at which a ball is hit" in the detailed information is a position other than a sweet spot, and (4) the position of the user shown in the sensor information is continuously located near a service line. When the notification information generating unit 650 determines that the above-mentioned conditions are satisfied based on the play event information and the sensor information, the notification information generating unit 650 transmits notification information used to output a sound "carefully toss" from the speaker 541 to the sensor device 500.

Further, the notification of the "remind (break)" is performed when the user starts playing and continues for 60 minutes. In the notification DB, for example, the following conditions are set as conditions for specifying this case: (1) a given play event other than the "break" occurs beforehand, (2) the play event "break" does not occur subsequently, and (3) a predetermined time (60 minutes) passes from the occurrence of the first play event. When the notification information generating unit 650 determines that the above-mentioned conditions are satisfied based on the play event information and the sensor information, the notification information generating unit 650 causes an LED to blink and transmits notification information used to vibrate the vibrator to the sensor device 500.

Furthermore, the notification of the "success confirmation" is performed when the user hits a ball at a sweet spot of a racket at the stroke time. In the notification DB, for example, the following conditions are set as conditions for specifying this case: (1) a play event "swing" occurs, (2) the "swing type" in the detailed information of the "swing" is a "stroke," and (3) the "position at which a ball is hit" in the detailed information is a sweet spot. When the notification information generating unit 650 determines that the above-mentioned conditions are satisfied based on the play event information, the notification information generating unit 650 transmits notification information used to display text "Good!" on the display device 542 to the sensor device 500.

(2-4. Example of Processing Flow)

FIG. 14 is a diagram illustrating an example of the flow of a process of providing notification information to a user according to the second embodiment of the present disclosure.

In this example, the steps (step S101 to step S109) of detecting the play event are the same as those described above with reference to FIG. 9 in the first embodiment.

When it is determined in step S109 that an effective play event occurs, the notification information generating unit 650 of the notification device 600 matches the occurring play event with the information registered in the notification DB 660 (step S311). In the matching, as described above, not only the information regarding the play event detected in step S109 just before but also the information regarding the play event detected until that time or the sensor information received in step S107 can be used.

When the matching with the notification conditions stored in the notification DB 660 occurs in step S311, the notification information generating unit 650 transmits the notification information to the sensor device 500 via the communication unit 610 (step S313). Here, the transmitted notification information can include, for example, notification device information used to specify the device (the speaker 541, the display device 542, or the like) used for the notification and notification action information indicating a specific operation of the notification.

Next, the communication unit 530 of the sensor device 500 receives the notification information (step S315). The communication unit 530 provides the received notification information to the notification output unit 540. The notification output unit 540 selects an appropriate notification device based on the provided notification information and executes a notification action (step S317).

(2-5. Summary of Embodiment)

The second embodiment of the present disclosure has been described. In this embodiment, for example, during the play of the sport, an appropriate notification is provided at the timing intended in advance by the user. Therefore, the user can conceive improvements or the like of the play recognized before the play even at a timing of the play at which the user is liable to focus on the play.

When the user focuses on the play, the user is liable to forget to take a break. However, for example, when a break is detected as one play event and the state in which the break is not detected continues for a long time, the user is notified of a necessity for a break, and thus an accident such as a heat-related illness can be prevented.

Thus, in this embodiment, proficiency at a sport or a secure play is realized by providing appropriate information to the user during the play of the sport. Accordingly, this embodiment is not limited to the example of tennis, but is applicable to all sports.

3. Third Embodiment

Next, a third embodiment of the present disclosure will be described. In the third embodiment of the present disclosure, play event information is generated in a sport such as golf that takes place around a course.

In this embodiment, hitting (shot) a ball is detected as a play event, for example, based on the sensor information obtained by detecting the vibration of an implement (golf club or the like) used by the user at the impact time. For example, position information is set by GPS information in the detailed information of the play event "shot."

For example, it is possible to identify where the shot is performed based on the position information. Thus, for example, in the case of golf, it is possible to identify at which hole the shot is performed, whether the shot is a tee shot, a bunker shot, or the like at a specific position, whether the shot is a putt on a green, or the like. For example, when imaging of play images is controlled or chapter information is added to the play images based on the result of the identification, as in the above-described first embodiment, it is useful for the user himself or herself to review the plays subsequently.

Further, a ball flying distance can be calculated as a distance between the positions of the consecutive shots. For example, the play images may be classified for each ball flying distance or it may be determined whether the shot succeeds or fails based on a relation between the position of the shot and the ball flying distance. Furthermore, an image in which the trajectory of a ball connecting the positions of the shots at the same hole is mapped on the map of the golf course may be generated as notification information, and then the notification information may be suggested to the user.

4. Other Embodiments

In the above-described embodiments, the user himself or herself playing a sport obtains the benefit, since the user reviews the images or the like of a play of the user himself or herself or the user is notified of a play of the user himself or herself. However, the embodiments of the present disclosure are not limited to the examples.

For example, as in the above-described first embodiment, play images in which only the portions of a specific play event are cut or a chapter or the like is set for each play event may be provided to users other than a user playing a sport, such as parents who send a child to a tennis school (which may, of course, be a school other than a tennis school, or a club activity or the like rather than a school). In this case, since the parents can view or easily search for only the portions in which their child is photographed in the play images, the parents can comprehend the activities of the child at the school with more accuracy in shorter time.

5. Hardware Configuration

Next, an example of a hardware configuration realizing a sensor device and an information processing device (corresponding to an imaging device, a notification device, or the like) according to an embodiment of the present disclosure will be described with reference to FIGS. 15 and 16.

(Sensor Device)

FIG. 15 is a diagram illustrating an example of the hardware configuration of the sensor device according to the embodiment of the present disclosure. A sensor device 800 can be realized as a sensor device according to the embodiment of the present disclosure, such as the sensor device 100 or the sensor device 500 described above.

The sensor device 800 can include a central processing unit (CPU) 801, a read-only memory (ROM) 802, a random access memory (RAM) 803, a vibration sensor and amplifier 804, a user interface 805, an external storage device 806, a communication device 807, and an image and sound output device 808. The constituent elements are connected to each other via, for example, a bus.

For example, the CPU 801, the ROM 802, and the RAM 803 read and execute program commands recorded in the external storage devices 806 so that various software functions are realized. In the embodiment of the present disclosure, for example, the CPU 801, the ROM 802, and the RAM 803 can realize control of the entire sensor device 800 or some of the functions of the preprocessing unit 120 described in the above-described example.

The vibration sensor and amplifier 804 corresponds to the sensor 110 in the functional configuration described in the above-described embodiments. The sensor device 800 may further include an acceleration sensor, an angular velocity sensor, a temperature sensor, a clock, or a GPS receiver.

The user interface 805 is an input device, such as a button or a touch panel, which receives a user's operation on the sensor device 800. The user's operation may be, for example, an operation of instructing start or end of transmission of the sensor information from the sensor device or an operation of instructing stop of the output of notification information when the notification information is provided.

The external storage device 806 stores various types of information regarding the sensor device 800. For example, the external storage device 806 may store program commands for causing the CPU 801, the ROM 802, and the RAM 803 to realize software functions or may temporarily cache data acquired by a sensor such as the vibration sensor and amplifier 804. When the sensor device 800 is considered to be mounted on a user himself or herself or a sports implement, a storage device such as a semiconductor memory strong against an impact is preferably used as the external storage device 806.

The communication device 807 corresponds to the communication unit 130 or 530 in the functional configuration according to the above-described embodiments. The communication device 807 communicates with an information processing device 900 to be described below by short-range wireless communication such as Bluetooth (registered trademark) or a wireless LAN. Further, when the information processing device 900 is a server device on a network, the communication device 807 may communicate with the information processing device 900 via a network such as the Internet.

The image and sound output device 808 may include a device capable of notifying a user of acquired information visually or audibly. The image and sound output device 808 can be a display device such as a liquid crystal display (LCD) or a sound output device such as a speaker or a headphone. The image and sound output device 808 corresponds to the notification output unit 540 in the functional configuration according to the above-described embodiment. Further, the sensor device 800 may further include a lighting unit such as an LED lamp or a vibrator that vibrates the user himself or herself or an implement as an output unit.

(Information Processing Device)

FIG. 16 is a diagram illustrating an example of a hardware configuration of an information processing device according to an embodiment of the present disclosure. The information processing device 900 can be realized as the information processing device according to the embodiment of the present disclosure or, for example, the imaging device 200 or the notification device 600 described above.

The information processing device 900 can include a CPU 901, a ROM 902, a RAM 903, a user interface 905, an external storage device 906, a communication device 907, and an image and sound output device 908. The constituent elements are connected to each other via, for example, a bus.

For example, the CPU 901, the ROM 902, and the RAM 903 read and execute program commands recorded in the external storage devices 906 so that various software functions are realized. In the embodiment of the present disclosure, for example, the CPU 901, the ROM 902, and the RAM 903 can realize control of the entire information processing device 900 or some of the functions of the analyzing unit 220, the control unit 230, and the notification information generating unit 650 described in the above-described example.

The user interface 905 is an input device, such as a button or a touch panel, which receives a user's operation on the information processing device 900. For example, the user interface 905 can realize the function of the registration unit 670 described in the above example.

The external storage device 906 stores various types of information regarding the information processing device 900. For example, the external storage device 906 may store program commands for causing the CPU 901, the ROM 902, and the RAM 903 to realize software functions or may temporarily cache the sensor information received by the communication device 907. Further, the external storage device 906 may store a log of the play event information or the sensor information. Furthermore, the external storage device 906 may store the notification DB 660 described in the above example.

The image and sound output device 908 may include a device capable of notifying a user of acquired information visually or audibly. The image and sound output device 908 can be a display device such as an LCD or a sound output device such as a speaker or a headphone. The image and sound output device 908 outputs a result obtained through the process of the information processing device 900 as a graphical image such as text or an image or a sound such as a voice or an audio.

6. Supplement

It should be understood by those skilled in the art that various modifications, combinations, sub-combinations and alterations may occur depending on design requirements and other factors insofar as they are within the scope of the appended claims or the equivalents thereof.

For example, in the above-described embodiments, the information processing system including the sensor device and the information processing device has been described. However, the information processing system includes, for example, a server (including a device realized collectively as a set of the functions of a plurality of devices) realizing at least some of the functions of the information processing device on a network, a program for causing a computer to realize the functions of the device, and a recording medium that records the program.

Additionally, the present technology may also be configured as below.

(1) An information processing device including:
a sensor information acquiring unit that acquires sensor information indicating a behavior of a user playing a sport; and
a play event information generating unit that detects occurrence of a play event in the sport based on the sensor information and generates play event information corresponding to the play event.

(2) The information processing device according to (1), further including:
a notification information generating unit that generates notification information for the user based on the play event information.

(3) The information processing device according to (2), wherein the notification information is information registered in advance in association with the play event by the user.

(4) The information processing device according to (2) or (3), wherein the notification information generating unit generates the notification information further based on the sensor information.

(5) The information processing device according to any one of (1) to (4), further including:
an imaging control unit that controls imaging of a play image of playing the sport based on the play event information.

(6) The information processing device according to (5), wherein the imaging control unit determines at least one of imaging start or imaging end of the play image which is a moving image based on the play event information.

(7) The information processing device according to (5) or (6), wherein the imaging control unit selects the play image imaged by each of a plurality of imaging devices based on the play event information.

(8) The information processing device according to any one of (1) to (7), further including:
an additional information setting unit that sets additional information to a play image of playing the sport based on the play event information.

(9) The information processing device according to (8), wherein the additional information setting unit sets chapter information corresponding to the play event to the play image which is a moving image.

(10) The information processing device according to any one of (1) to (9), wherein the sensor information acquiring unit is a communication unit that receives the sensor information from an external device mounted on the user or a sports implement used by the user.

(11) The information processing device according to (10), further including: a notification information generating unit that generates notification information for the user based on the play event information,
wherein the communication unit transmits the notification information to the external device.

(12) The information processing device according to any one of (1) to (11),
wherein the sensor information acquiring unit acquires the sensor information indicating behaviors of a plurality of users playing the sport, and
wherein the play event information generating unit includes information used to specify a user corresponding to the play event.

(13) An information processing system including:
a sensor device including
a sensor that acquires sensor information indicating a behavior of a user playing a sport, and
a communication unit that transmits the sensor information; and
an information processing device including
a communication unit that receives the sensor information from the sensor device, and
a play event information generating unit that detects occurrence of a play event in the sport based on the sensor information and generates play event information corresponding to the play event.

(14) The information processing system according to (13),
wherein the information processing device further includes a notification information generating unit that generates notification information for the user based on the play event information,
wherein the communication unit of the information processing device transmits the notification information to the sensor device,
wherein the communication unit of the sensor device receives the notification information from the information processing device, and
wherein the sensor device further includes an output unit that outputs the notification information to the user and is mounted on the user or a sports implement used by the user.

(15) A program for causing a computer to execute:
a function of acquiring sensor information indicating a behavior of a user playing a sport; and
a function of detecting occurrence of a play event in the sport based on the sensor information and generating play event information corresponding to the play event.

(16) An information processing device including:
a control unit to generate play event information based on a determination whether detected behavior of a user is a predetermined play event.

(17) The information processing device according to (16), wherein the control unit controls an imaging device based on the play event information.

(18) The information processing device according to (16) or (17), wherein the imaging device includes an information processing unit.

(19) The information processing device according to any one of (16) to (18) further comprising:
an imaging device.

(20) The information processing device according to any one of (16) to (19), wherein the predetermined play event includes an effective play event and a play event that is not an effective play event.

(21) The information processing device according to any one of (16) to (20), wherein the control unit determines at least one of imaging start or imaging end of a play image which is a moving image based on the play event information.

(22) The information processing device according to any one of (16) to (21), wherein the control unit selects a play image imaged by each of a plurality of imaging devices based on the play event information.

(23) The information processing device according to any one of (16) to (22), wherein the control unit sets additional information based on the play event information.

(24) The information processing device according to (23), wherein the additional information includes chapter information.

(25) The information processing device according to (23) or (24), wherein the additional information is set to a play image based on the play event information.

(26) The information processing device according to any one of (16) to (24), wherein the control unit generates notification information for the user based on the play event information.

(27) The information processing device according to (26), wherein the notification information is information registered in advance in association with the play event by the user.

(28) The information processing device according to (26) or (27), wherein the notification information is generated based on sensor information indicating the behavior of the user.

(29) The information processing device according to (26), (27) or (28), wherein the control unit controls transmission of the notification information to an external device.

(30) The information processing device according to any one of (16) to (29), wherein the control unit generates play event information for each of a plurality of users based on a determination whether detected behavior of each of the plurality of users is a predetermined play event.

(31) The information processing device according to (30), wherein a play event corresponds to each of the users.

(32) The information processing device according to any one of (16) to (31), wherein the determination is based on sensor information indicating the behavior of the user.

(33) The information processing device according to (32), wherein the sensor information is detected by a sensor device mounted on the user or a sports implement which the user uses.

(34) A system including:
a sensor device to acquire sensor information indicating behavior of a user; and
a control unit to generate play event information based on a determination whether detected behavior of a user is a predetermined play event.

(35) An information processing method including:
generating, by a processor, play event information based on a determination whether detected behavior of a user is a predetermined play event.

(36) A non-transitory recording medium recorded with a program executable by a computer, the program including:
generating play event information based on a determination whether detected behavior of a user is a predetermined play event.

REFERENCE SIGNS LIST

10, 20 Information processing system
100, 500 Sensor device
110 Sensor
130, 530 Communication unit
200 Imaging device
210 Communication unit
220 Analyzing unit
221 Play event information generating unit
230 Control unit
231 Imaging control unit
232 Chapter setting unit
240 Imaging unit
300 Server
540 Notification output unit
541 Speaker
542 Display device
600 Notification device 610 Communication unit
650 Notification information generating unit
660 Notification DB
670 Registration unit

The invention claimed is:

1. An information processing device comprising:
   a communication device configured to wirelessly receive sensor information from a sensor device; and
   a processor configured
   to generate play event information using the sensor information,
   to determine from the play event information whether a detected behavior of a user is a predetermined play event,
   to control an imaging device to capture play images based on the predetermined play event, and
   identify a type of play event based on the play event information and a sport associated with a play event.

2. The information processing device of claim 1, wherein the processor controls the imaging device based on the play event information so as to not capture images associated with ineffective play events, ineffective play events comprising one or more events that are designated as not part of the sport.

3. The information processing device of claim 2, wherein the imaging device includes an information processing unit.

4. The information processing device of claim 1 further comprising the imaging device.

5. The information processing device of claim 1, wherein the predetermined play event includes an effective play event and an ineffective play event, the effective play event comprising an event that is designated as part of the sport and the ineffective play event comprising an event that is designated as not part of the sport.

6. The information processing device of claim 1, wherein the processor determines at least one of imaging start or imaging end of a play image which is a moving image based on the play event information.

7. The information processing device of claim 1, wherein the processor selects a play image imaged by each of a plurality of imaging devices based on the play event information.

8. The information processing device of claim 1, wherein the processor generates notification information for the user based on the play event information.

9. The information processing device of claim 8, wherein the notification information is information registered in association with the predetermined play event by the user.

10. The information processing device of claim 8, wherein the notification information is generated based on the sensor information indicating the detected behavior of the user.

11. The information processing device of claim 8, wherein the processor controls transmission of the notification information to an external device.

12. The information processing device of claim 1, wherein the processor generates play event information for each of a plurality of users based on a determination whether detected behavior of each of the plurality of users is the predetermined play event.

13. The information processing device of claim 12, wherein a respective play event corresponds to each of the users.

14. The information processing device of claim 1, wherein the sensor device is mounted on the user or a sports implement which the user uses.

15. The information processing device of claim 1, wherein the predetermined play event includes an effective play event and the processor is further configured to exclude one or more ineffective play events from images associated with the predetermined play event, the effective play event comprising an event that is designated as part of the sport and the one or more ineffective play events comprising one or more events that are designated as not part of the sport.

16. A system comprising:
   a sensor device to acquire sensor information indicating behavior of a user and to wirelessly transmit the sensor information;
   a communication device to wirelessly receive the sensor information transmitted by the sensor device;
   a camera that captures images of the user; and
   a processor configured to generate play event information based on the sensor information received by the communication device and to identify a type of play event based on the play event information and a sport associated with a play event,
   in which the processor is configured to control capturing of play images by the camera in a time interval of a predetermined play event and based on the generated play event information to exclude one or more play events.

17. The system of claim 16, wherein the processor is configured to distinguish an effective play event from an ineffective play event based on the play event information and to control the images captured by the camera to exclude one or more ineffective play events, the effective play event comprising an event that is designated as part of the sport and the one or more ineffective play events comprising one or more events that are designated as not part of the sport.

18. An information processing method comprising:
   wirelessly receiving sensor information from a sensor device configured to detect movement associated with a user;
   generating, by a processor, play event information based on the sensor information;
   determining whether a detected user movement is a predetermined play event based on the play event information;
   identifying a type of play event based on the play event information and a sport associated with a play event; and
   controlling an imaging device to capture play images based on the predetermined play event.

19. The method of claim 18, further comprising:
   determining whether a detected user movement is the predetermined play event based on the play event information,
   analyzing the play event information to distinguish between different types of play events and to exclude one or more ineffective play events from images associated with the predetermined play event, the one or more ineffective play events comprising one or more events that are designated as not part of the sport.

20. A non-transitory recording medium recorded with a program executable by a computer, the program comprising:
   enabling sensor information from a sensor device to be wirelessly received;
   generating play event information based on the sensor information received by a communication device to determine whether detected behavior of a user is a predetermined play event;

identifying a type of play event based on the play event information and a sport associated with a play event; and controlling an imaging device to capture play images based on the predetermined play event.

21. The non-transitory recording medium of claim 20, further comprising:

analyzing the play event information to distinguish between different types of play events; and analyzing the play event information to distinguish an effective play event from an ineffective play event based on the play event information, the effective play event comprising an event that is designated as part of the sport and the ineffective play event comprising an event that is designated as not part of the sport.

* * * * *